United States Patent
Iwatani et al.

(10) Patent No.: US 7,316,441 B2
(45) Date of Patent: Jan. 8, 2008

(54) SEAT MOVING DEVICE FOR VEHICLE

(75) Inventors: Masamitsu Iwatani, Kariya (JP); Takafuki Hijikata, Kariya (JP); Chikanori Fujita, Kokubu (JP); Yasuo Suga, Kariya (JP); Yoshiyuki Miura, Kariya (JP); Kenji Horiguchi, Kariya (JP); Kenji Murabayashi, Kariya (JP); Susumu Yamada, Kariya (JP)

(73) Assignee: Toyota Shatai Kabushiki Kaisha, Aichi (JP)

( * ) Notice: Subject to any disclaimer, the term of this patent is extended or adjusted under 35 U.S.C. 154(b) by 134 days.

(21) Appl. No.: 10/524,219

(22) PCT Filed: Aug. 8, 2003

(86) PCT No.: PCT/JP03/10188

§ 371 (c)(1),
(2), (4) Date: Aug. 23, 2005

(87) PCT Pub. No.: WO2004/016461

PCT Pub. Date: Feb. 26, 2004

(65) Prior Publication Data

US 2006/0131943 A1 Jun. 22, 2006

(30) Foreign Application Priority Data

Aug. 12, 2002 (JP) ............... 2002-235163
Oct. 28, 2002 (JP) ............... 2003-313274
Apr. 14, 2003 (JP) ............... 2003-109048

(51) Int. Cl.
*B60N 2/02* (2006.01)

(52) U.S. Cl. ............... 296/65.12; 296/65.15; 297/344.13

(58) Field of Classification Search ......... 296/65.07, 296/65.11–65.15; 297/344.13, 344.17, 344.23, 297/344.24; *B60N 2/14, 2/16*
See application file for complete search history.

(56) References Cited

U.S. PATENT DOCUMENTS 3,236,556 A * 2/1966 Lathers ............... 296/65.08

(Continued)

FOREIGN PATENT DOCUMENTS

EP 0 808 740 A2 11/1997

(Continued)

*Primary Examiner*—Dennis H. Pedder
*Assistant Examiner*—Mike Hernandez
(74) *Attorney, Agent, or Firm*—Patterson, Thuente, Skaar & Christensen, P.A.

(57) ABSTRACT

It is one object of this invention to provide a technique that is effective in diminishing the range of fluctuation of a load applied to a drive source when a seat main body in a vehicle seat moving apparatus is moved between a raised position and a lowered position.

For this purpose, this invention provides a vehicle seat moving apparatus constructed as follows. Provided on a rotation base 31, for rotating a seat main body 10 between a position where it faces the front side of the vehicle and a position where it faces a door opening, is a widthwise slide base 41 that moves horizontally in the vehicle width direction while the seat main body 10 faces the door opening. The seat main body 10 is supported by the slide base 41 via four-bar linkage mechanisms 44. Guide rollers 46 are attached to upper link arms 44a of the four-bar linkage mechanisms 44. The guide rollers 46 are placed on cam surfaces of cam plates 47 provided to the rotation base 31. The cam surfaces have continuously extending inclined guide surfaces 47b that guide such that the guide rollers 46 move obliquely upwards when the widthwise slide base 41 moves.

8 Claims, 33 Drawing Sheets

U.S. PATENT DOCUMENTS

| | | | |
|---|---|---|---|
| 4,600,239 A | * | 7/1986 | Gerstein et al. ........ 297/344.23 |
| 5,042,864 A | * | 8/1991 | Mochizuki ............... 296/65.07 |
| 5,524,952 A | * | 6/1996 | Czech et al. ............. 296/65.12 |
| 5,630,638 A | * | 5/1997 | Hirasawa et al. ........ 296/65.07 |
| 5,769,480 A | * | 6/1998 | Gebhardt ................. 296/65.12 |
| 6,024,398 A | * | 2/2000 | Horton et al. ........... 296/65.07 |
| 6,543,848 B1 | * | 4/2003 | Suga et al. ............ 297/344.24 |
| 6,962,383 B2 | * | 11/2005 | Takenoshita et al. .... 296/65.03 |
| 7,083,214 B2 | * | 8/2006 | Hayakawa et al. ...... 296/65.12 |
| 2006/0255640 A1 | * | 11/2006 | Kusanagi et al. ...... 297/344.21 |

FOREIGN PATENT DOCUMENTS

JP          11-113965          4/1999

* cited by examiner

SEAT MOVING DEVICE FOR VEHICLE

TECHNICAL FIELD

This invention relates to a vehicle seat moving apparatus that makes it possible for, for example, a physically handicapped person, an elderly person or other such persons (hereinafter simply referred to as "occupant") to easily get in and out of the vehicle.

BACKGROUND ART

A conventional technique regarding a vehicle seat moving apparatus of this type is taught, for example, by Japanese Laid-Open Patent Publication No. 9-39622. As shown in FIG. 17, this conventional vehicle seat moving apparatus has a rotation base 102 for rotating a seat main body 101 between a position where it faces the front side of the vehicle and a position where it faces a door opening K, and a slide base 103 is provided to the rotation base 102 so as to be horizontally movable. Further, a seat support base 105 is supported on the slide base 103 via a vertically rotatable four-bar linkage mechanism 104 that is constituted of an upper link arm 104a and a lower link arm 104b. The seat main body 101 is supported on the seat support base 105 so as to be horizontally movable in the same direction as the moving direction of the slide base 103. The seat main body 101 can move in the vehicle width direction between the interior and the exterior of the vehicle cabin via the door opening K when it moves relative to the seat support base 105 at the position where it faces the door opening K.

Further, an ascent/descent guide pin 106 as an ascent/descent guide member is provided to an end of the rotation base 102 so that the lower link arm 104b of the four-bar linkage mechanism 104 is supported by the ascent/descent guide pin 106. Therefore, when the slide base 103 is moved so as to approach the door opening K while the seat main body 101 moved to the exterior of the vehicle cabin, the lower link arm 104b of the four-bar linkage mechanism 104 downwardly rotates while sliding on the ascent/descent guide pin 106 so that the seat main body 101 moves from a raised position to a lowered position while maintaining a horizontal posture. When the slide base 103 moves away from the door opening K, the lower link arm 104b is upwardly rotated while sliding on the ascent/descent guide pin 106 so that the seat main body 101 moves from the lowered position to the raised position. The lower link arm 104b is formed in a curved configuration in order to move the seat main body 101 up and down along a predetermined path.

DISCLOSURE OF THE INVENTION

In the above-described conventional vehicle seat moving apparatus, as the slide base 103 moves, the lower link arm 104b formed in the curved configuration vertically rotates while sliding on the ascent/descent guide pin 106 under a condition that it is supported from below by the ascent/descent guide pin 106. Thus, a distance L between a fulcrum P of the lower link arm 104b supported by the ascent/descent pin 106 and a rotation center Q of the lower link arm 104b changes with the movement of the slide base 103. As a result, when the slide base 103 is constructed to be moved by a driving device that utilizes, for example, an electric motor as a drive source, the load applied to the electric motor fluctuates greatly. When the range of fluctuation of the load applied to the electric motor is so large, the electric motor may suffer premature deterioration.

The present invention is made in view of the problem in the prior art described above. It is one object of the present invention to provide a technique that is effective in reducing the range of fluctuation of the load applied to the drive source when the seat main body in a vehicle seat moving apparatus is moved between a raised position and a lowered position.

To achieve the above object, a vehicle seat moving apparatus of the present invention includes a slide base provided to a vehicle floor side so as to be horizontally movable between a retreated position and an advanced position, a driving device for moving the slide base, a seat raising/lowering arm that supports the seat main body at one end and is vertically rotatably attached to the slide base at the other end, and an ascent/descent guide member that is provided to the vehicle floor side and is adapted to guide the seat raising/lowering arm such that it is vertically rotated as the slide base moves, wherein when the slide base moves between the retreated position and the advanced position, the seat raising/lowering arm is vertically rotated so that the seat main body is moved between the raised position and the lowered position, in which the range of fluctuation of the load on the drive source when moving the seat main body between the raised position and the lowered position can be reduced.

The ascent/descent guide member supports from below a supported portion that is provided to the seat raising/lowering arm at a position spaced apart from the rotation center of the seat raising/lowering arm at a predetermined interval, and includes a continuously extending inclined guide surface that guides such that the supported portion moves obliquely along a predetermined path when the slide base moves between the retreated position and the advanced position.

That is, when the seat raising/lowering arm moves together with the slide base, the distance from the fulcrum of the seat raising/lowering arm supported by the ascent/descent guide member to the rotation center of the seat support arm is maintained as a constant. Due to this arrangement, as compared with the prior art in which the distance from the rotation center to the fulcrum successively changes, it is possible to reduce the range of fluctuation of the load applied to an electric motor. As a result, it is possible to reduce the load applied to the drive source, thereby increasing durability thereof.

Further, the ascent/descent guide member has a horizontal guide surface on which the supported portion horizontally moves when the slide base is moved from the advanced position to the retreated position.

Therefore, in the condition in which the slide base is moved to the retreated position, the supported portion is retained on the horizontal guide surface of the ascent/descent guide member. This makes it possible to retain the seat main body at the raised position without applying any load to the electric motor.

When the slide base moves between the retreated position and the advanced position, the seat raising/lowering arm moves in an ascent/descent movement region in which it is vertically rotated while it is guided by the ascent/descent guide member and a horizontal movement region which does not involve vertical rotation. The horizontal movement of the seat raising/lowering arm in the horizontal movement region is performed by supporting a lower surface of the seat raising/lowering arm by means of a horizontal retaining member that can slidably contact the lower surface. While the seat raising/lowering arm is moving in the horizontal movement region, the horizontal retaining member is positioned in an advanced side relative to the supported portion.

If the horizontal movement of the seat raising/lowering arm is performed, for example, by moving the supported portion on the horizontal guide surface of the ascent/descent guide member, an upward force as the reaction force of a load of the seat main body side is applied to the arm support portion of the slide base that rotatably supports the seat raising/lowering arm. In this case, if the distance from the rotation center of the seat raising/lowering arm to the supported portion cannot be increased, such an upward force is increased, thereby increasing the load on the electric motor for moving the slide base.

The horizontal movement of the seat raising/lowering arm is performed by supporting the lower surface of the seat raising/lowering arm by means of the horizontal retaining member that slidably contacts the lower surface. Therefore, it is possible to increase the distance from the rotation center of the seat raising/lowering arm to the fulcrum of the seat raising/lowering arm by the horizontal retaining member while the seat raising/lowering arm moves in the horizontal movement region. This makes it possible to reduce the upward force applied to the arm support portion of the slide base and to smoothly move the slide base.

The ascent/descent guide member has a stopper portion which is positioned at an end of the inclined guide surface. The stopper portion contacts the supported portion that moves obliquely downwards on the guide surface, thereby restraining further movement of the supported portion. Therefore, according to this invention, at the time that the seat main body moves to the lowered position, it is possible to prevent an overrun of the seat raising/lowering arm by the stopper portion. Further, the stopper can be easily formed during formation of the ascent/descent guide member. Also, it is possible to reduce the number of parts.

The ascent/descent guide member is composed of a cam plate, and the supported portion of the seat raising/lowering arm is composed of a roller that rolls on the cam plate. Therefore, according to this invention, it is possible to smoothly lower and raise the seat main body along a predetermined path.

The seat raising/lowering arm is composed of two plates that are arranged at a predetermined interval and a connecting member that interconnects opposing end portions of the two plates, and a roller is disposed between the two plates. Therefore, according to this invention, because the seat raising/lowering arm is composed of the two plates opposed to each other at a predetermined interval, as compared with the case in which it is formed, for example, by a single plate, the rigidity of the seat raising/lowering arm with respect to a direction of a plate thickness (a direction of the plate arrangement) can be increased, and the roller may have a both end supported stable support form. This makes it possible to eliminate or reduce the rolling of the seat main body during its ascent/descent or horizontal movement. Further, an arm width (a width of the plates) of the seat raising/lowering arm can be reduced while ensuring a desired strength. Therefore, the seat raising/lowering arm can be downsized with respect to the height direction. This makes it possible to minimize the height of the seat when the seat raising/lowering arm is arranged on the lower surface of the seat main body.

The driving device for the slide base is composed of an electric motor, a screw shaft rotated by the electric motor, and a nut meshing with the screw shaft. The screw shaft is provided with a stopper member. When a relative moving amount of the screw shaft and the nut in an axial direction exceeds a predetermined value, the stopper member contacts the nut, thereby restraining further relative movement.

According to this construction, at the time that the relative moving amount in the axial direction of the screw shaft and the nut exceeds a predetermined value, i.e., at the time of a so-called overrun, a reaction force is applied solely to the screw shaft and a reduction gear disposed between the screw shaft and the electric motor and not to the other components. Therefore, by appropriately setting the strength of the screw shaft and the reduction gear as well as the motor torque, it is possible to prevent damaging the driving device.

BEST MODE FOR CARRYING OUT THE INVENTION

Figure 1:
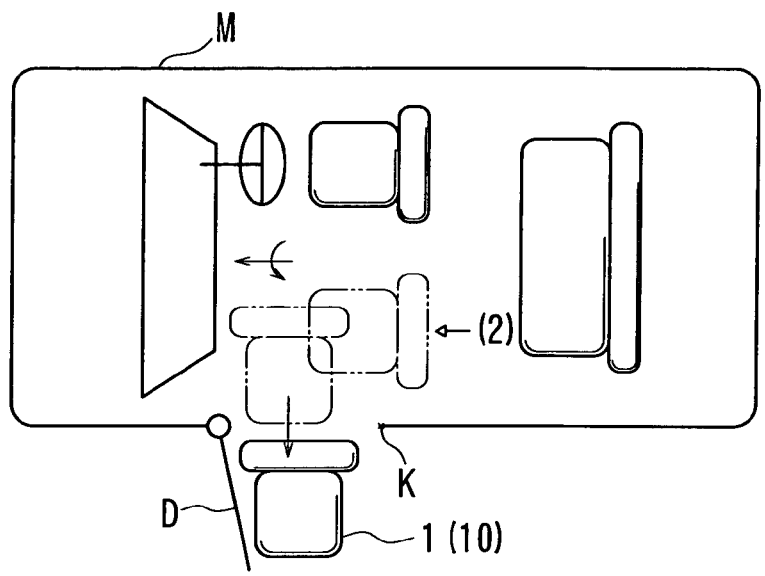
FIG. 1 is a plan view of a vehicle, showing the movement of a vehicle seat moving apparatus according to a first embodiment of the present invention.

Embodiments of the present invention will now be described with reference to the drawings. First, a first embodiment will be described with reference to FIGS. 1-11. FIG. 1 shows a vehicle M in which a vehicle seat moving apparatus according to the first embodiment is applied to a passenger seat. FIG. 1 shows a condition in which a door D at the passenger seat is open and in which a seat main body 10 is moved to the exterior of a cabin via a door opening K.

In the vehicle seat moving apparatus 1 of this embodiment, the seat main body 10 can move in a longitudinal direction of the vehicle and can rotate by approximately 90 degrees between a position where it faces the front side of the vehicle and a position where it faces the door opening K. Further, the seat main body can move in a vehicle width direction between interior and exterior of the vehicle cabin under a condition where it faces the door opening K. The seat main body 10 described herein includes a seat cushion 11 and a seat back 12.

Figure 2:
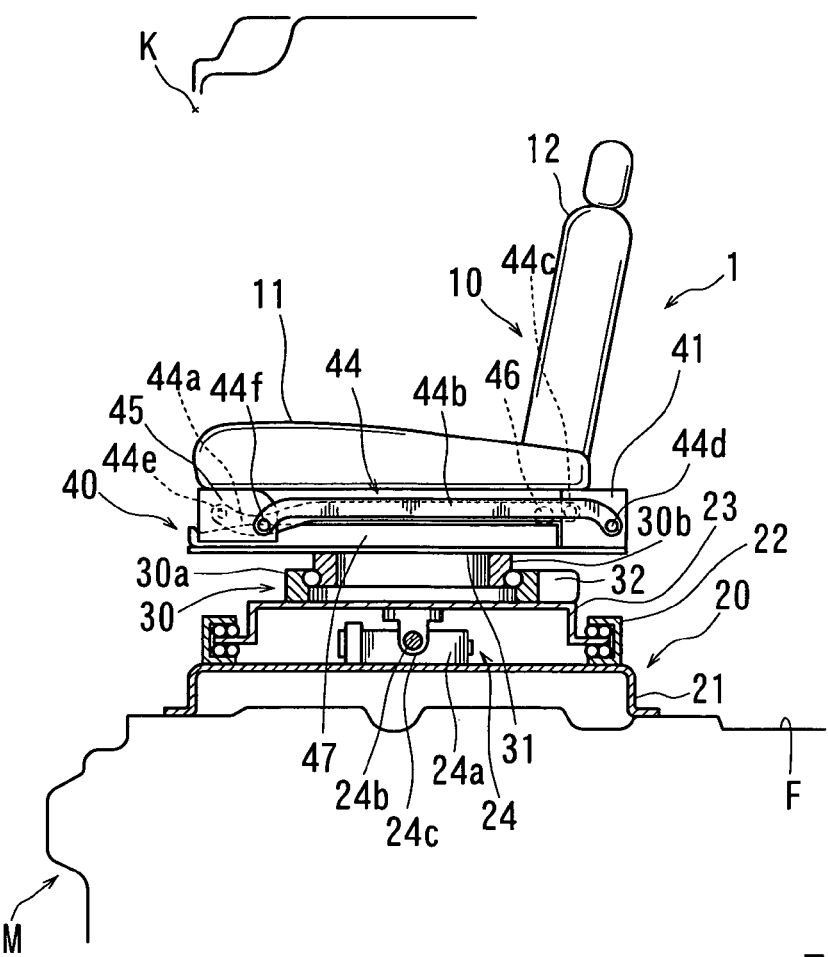
FIG. 2 is rear view of the vehicle seat moving apparatus, which is viewed along an arrow (2) of FIG. 1. This diagram shows a condition in which a seat main body faces a door opening.
Figure 3:
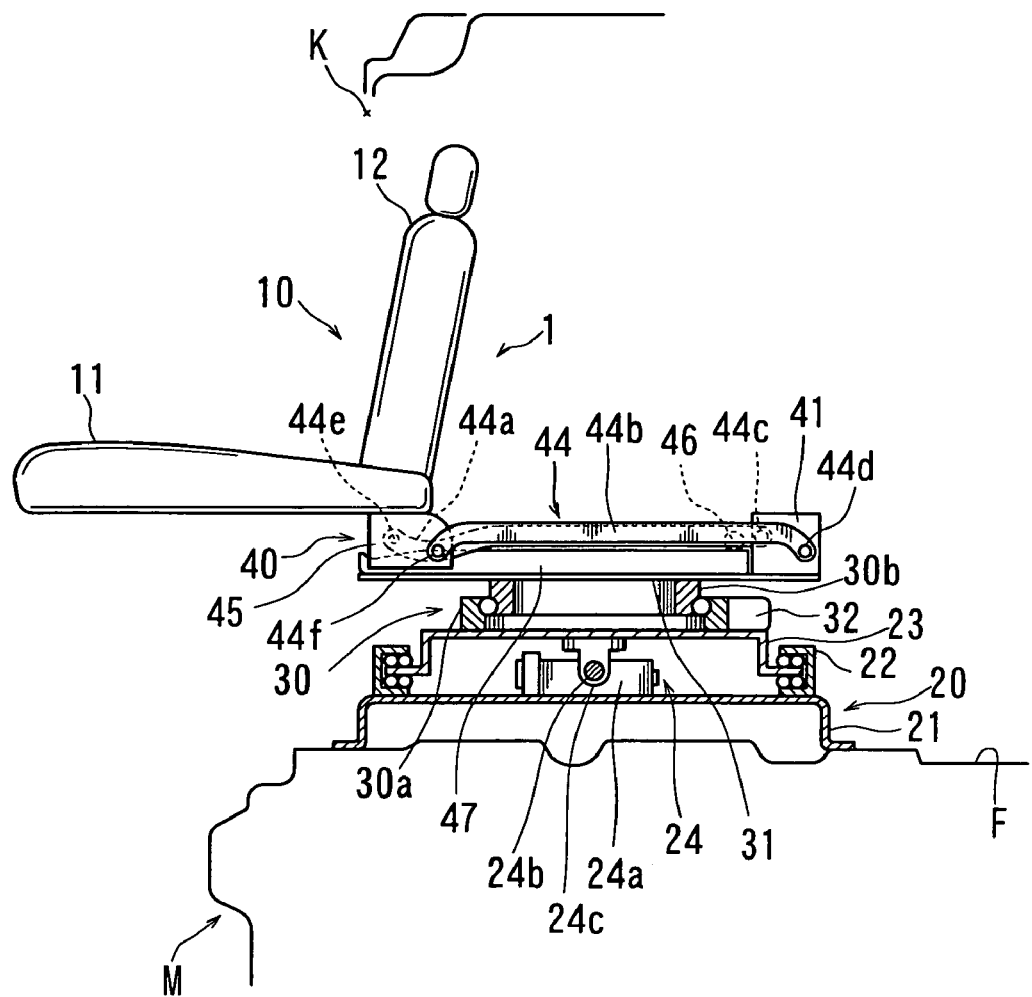
FIG. 3 is a rear view of the vehicle seat moving apparatus, showing a condition in which the seat main body is moved to the exterior of a vehicle cabin by an auxiliary slide mechanism.
Figure 4:
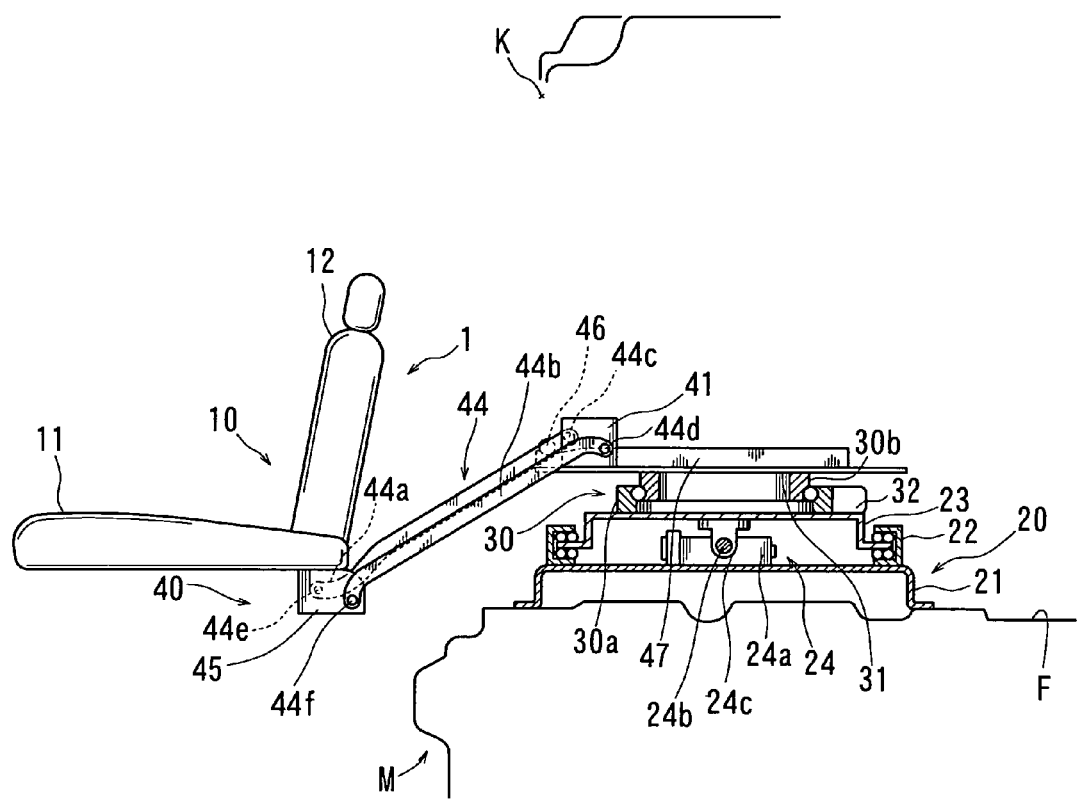
FIG. 4 is a rear view of the vehicle seat moving apparatus, showing a condition in which the seat main body is moved to the exterior of the vehicle cabin by a widthwise slide mechanism while it is lowered to a level close to the ground surface.

As shown in FIGS. 2-4, the vehicle seat moving apparatus 1 includes the seat main body 10, a longitudinal movement mechanism 20 for moving the seat main body 10 in the longitudinal direction of the vehicle (a direction perpendicular to the plane of FIGS. 2-4), a rotation mechanism 30 for rotating the seat main body 10 between a position where it faces the front side of the vehicle and a position where it faces the door opening K, and a raising/lowering device 40 for moving (raising/lowering) the seat main body 10 facing the door opening K in the vehicle width direction between the interior and the exterior of the cabin via the door opening K.

The longitudinal movement mechanism 20 has a stationary base 21 that is fixed to a floor F of the vehicle M. A longitudinal slide base 23 is provided to the upper surface of the stationary base 21 via guide rails 22 that are positioned in parallel with each other and are attached thereto, so as to slide in the longitudinal direction of the vehicle. Disposed between the stationary base 21 and the longitudinal slide base 23 is a longitudinal slide driving device 24 that has an electric motor 24a as a drive source for longitudinal movement, a screw shaft 24b and a nut 24c. By actuating the electric motor 24a of the longitudinal slide driving device 24, the screw shaft 24b meshing with the nut 24c is rotated so that the longitudinal slide base 23 can be moved forwards or backwards relative to the vehicle (in a direction perpendicular to the plane of the drawing).

Next, the rotation mechanism 30 has an outer ring 30a and an inner ring 30b that are combined so as to be coaxially rotatable relative to each other. The outer ring 30a is fixed to the upper surface of the longitudinal slide base 23. A rotation base 31 is fixed to the upper surface of the inner ring 30b. An electric motor 32, as a drive source for rotation, is mounted on the upper surface of the longitudinal slide base 23. The rotation output of the electric motor 32 is transmitted to the inner ring 30b via a gear transmission mechanism (not shown), thereby integrally rotating the rotation base 31, and by extension the raising/lowering device 40 that is disposed on the rotation base 31 and the seat main body 10.

Next, the raising/lowering device 40 has a widthwise slide base 41 that can slide in the vehicle width direction (a lateral direction in FIG. 2) on the rotation base 31 of the rotation mechanism 30.

Figure 5:
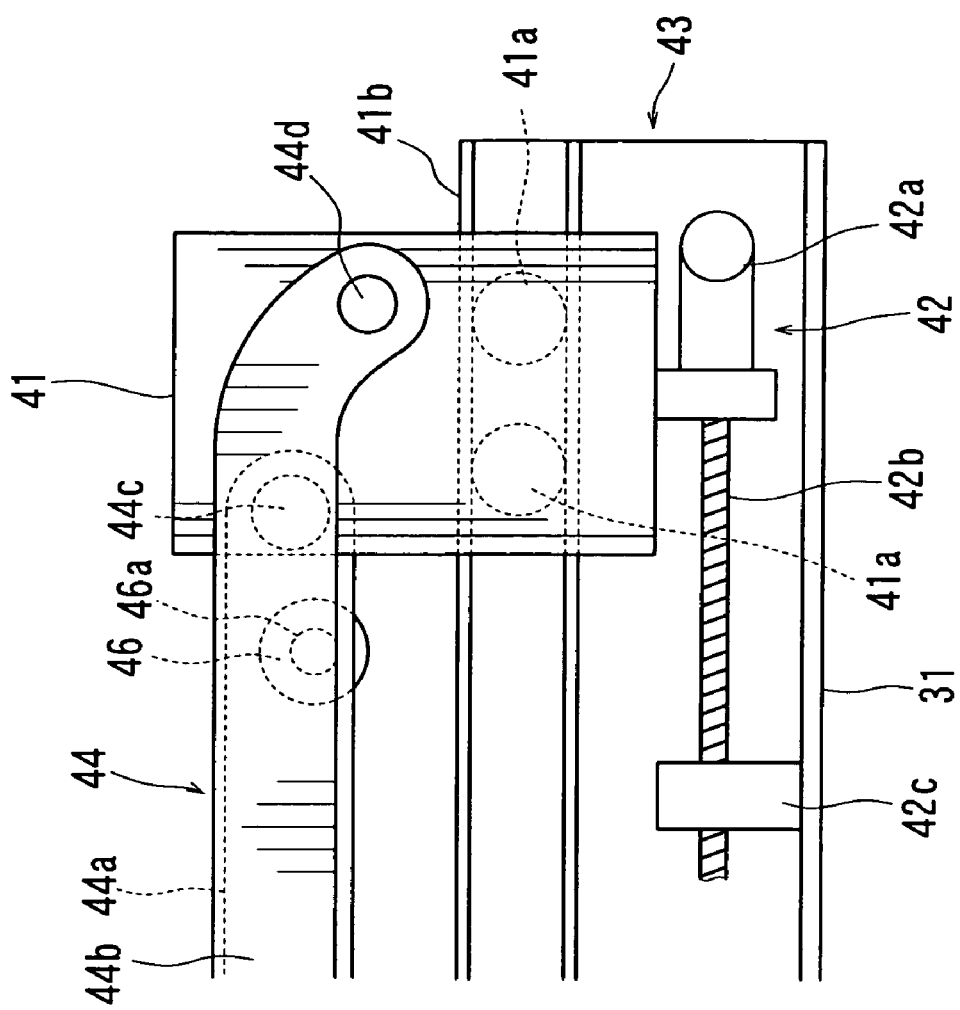
FIG. 5 is a diagram schematically illustrating the slide structure of a widthwise slide base, which is viewed from a lateral side.
Figure 6:
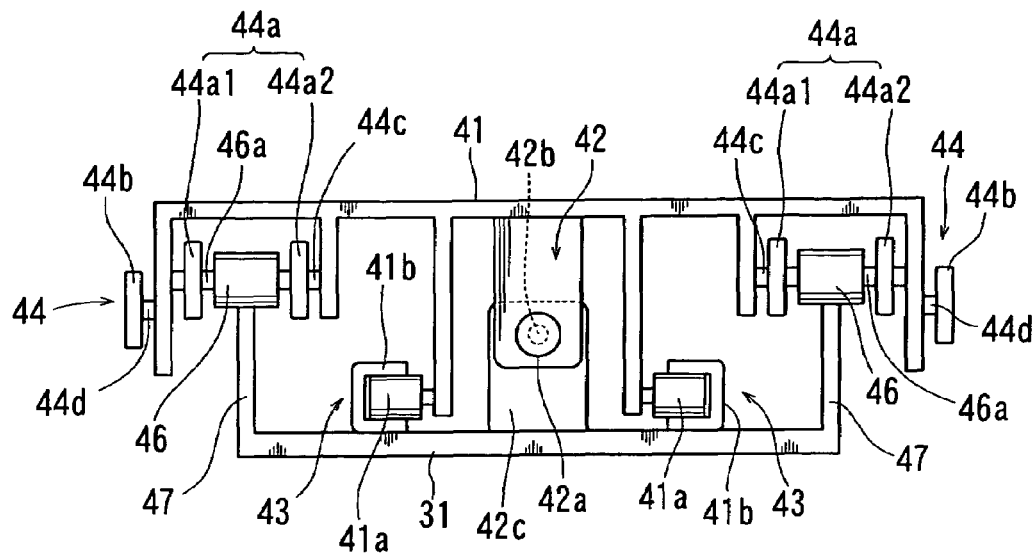
FIG. 6 is a diagram viewed from a rear side.

The widthwise slide base 41 is supported via slide rails 41b that are positioned in parallel with each other along the end edges of the rotation base 31 and are attached thereto, so as to be slidable in the vehicle width direction. FIG. 5 is a diagram schematically illustrating the slide structure of the widthwise slide base 41, which is viewed from a lateral side, and FIG. 6 is a diagram viewed from a rear side. As shown in the drawings, the widthwise slide base 41 is slidable relative to each of the slide rails 41b via two slide rollers 41a. The slide rollers 41a are rotatably attached to the side surfaces of the widthwise slide base 41 at a fixed interval.

Further, provided between the widthwise slide base 41 and the rotation base 31 is a widthwise slide driving device 42 that has an electric motor 42a as a widthwise slide drive source, a screw shaft 42b and a nut 42c. By actuating the electric motor 42a, the screw shaft 42b, meshing with the nut 42c, is rotated so that the widthwise slide base 41 can be moved between a retreated position spaced apart from the door opening K and an advanced position close to the door opening K. A widthwise slide mechanism 43 is constructed from the widthwise slide base 41, the slide rails 41b, the slide rollers 41a and the widthwise slide driving device 42. The widthwise slide base 41 described above corresponds to a slide base of the present invention, and the widthwise slide driving device 42 corresponds to a driving device of the present invention.

Further, as shown in FIGS. 2-4, right and left four-bar linkage mechanisms 44 are respectively mounted on the both side portions of the widthwise slide base 41. Further, the expression "right and left" referred to herein means "right and left" under a condition in which the seat main body 10 faces the front side of the vehicle. Each of the four-bar linkage mechanisms has an upper link arm 44a and a lower link arm 44b. Ends of the link arms 44a and 44b are respectively vertically rotatably supported by the side portions of the widthwise slide base 41 via axles 44c and 44d, and opposite ends thereof are rotatably connected to the side portions of an auxiliary base 45 via axles 44e and 44f. That is, the link arms 44a and 44b are supported by the widthwise slide base 41 at one end and support the auxiliary base 45 at the other end. Further, the upper link arms 44a and the lower link arms 44b are offset in the lateral direction (a direction of plate thickness) in order to prevent mutual interference thereof. The upper link arms 44a described above correspond to seat raising/lowering arms of the present invention.

Figure 7:
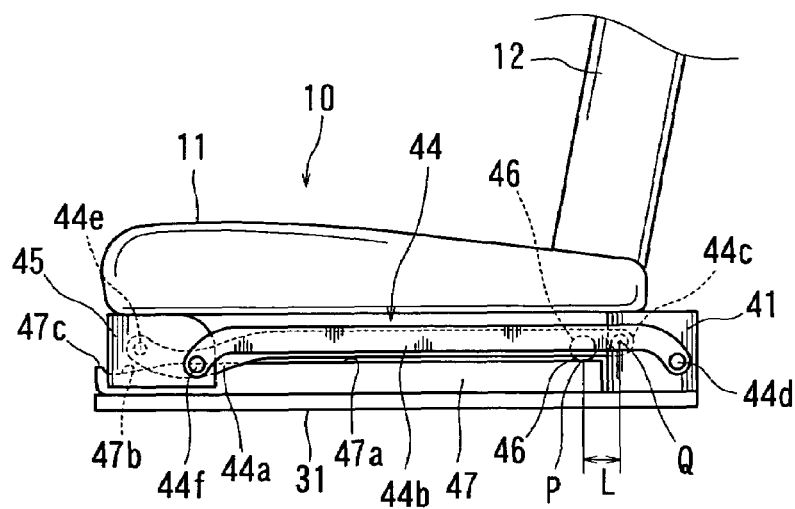
FIG. 7 is a diagram illustrating a raising/lowering mechanism for the seat main body.
Figure 8:
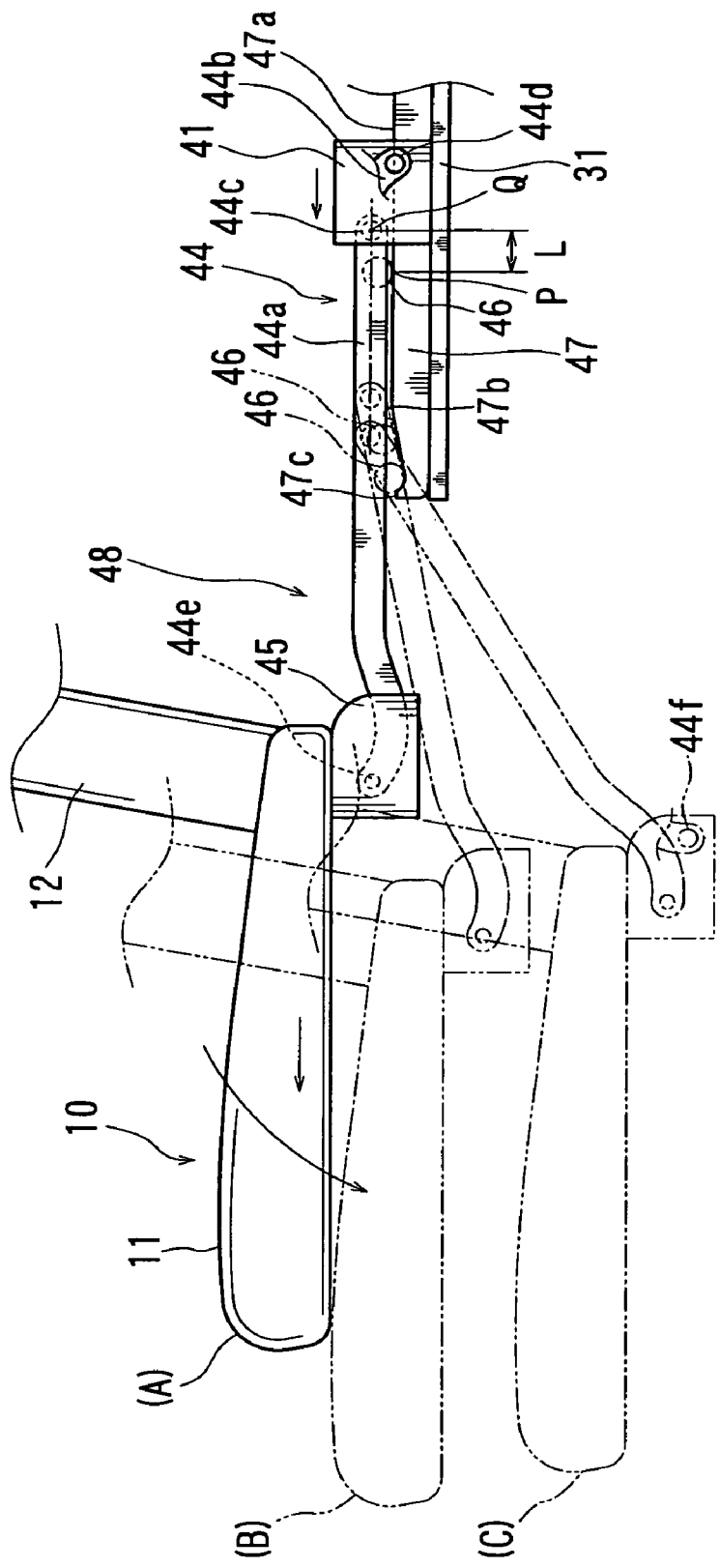
FIG. 8 is a diagram illustrating an operation mode of the raising/lowering mechanism.

The right and left upper link arms 44a have guide rollers 46 that are positioned spaced apart by a predetermined distance from centers of the axles 44c constituting rotation centers thereof. The guide rollers 46 are placed on cam surfaces of right and left cam plates 47 that are attached to the right and left sides of the rotation base 31. Consequently, when both of the four-bar linkage arm mechanisms 44 are moved in the vehicle width direction together with the widthwise slide base 41, the guide rollers 46 of the upper link arms 44a roll along the cam surfaces of the cam plates 47. Further, the cam plates 47 are formed from plates having a vertically elongated rectangular cross-sectional shape and the cam surfaces are formed along the upper ends thereof. FIGS. 7 and 8 show the cam plates 47 and the four-bar linkage mechanisms 44. Further, in FIG. 8 which shows an operation mode of the four-bar linkage mechanisms 44, mainly the upper link arms 44a with rollers are shown.

As shown in the drawings, the cam surface of each cam plate 47 has a horizontal guide surface 47a which guides such that the guide roller 46 moves horizontally when the widthwise slide base 41 moves toward the door opening K (from the retreated position to the advanced position), and an inclined guide surface 47b which guides such that the guide roller 46 moves obliquely downwardly along a predetermined path. The inclined guide surface 47b is formed by a curved surface that continuously extends in a gentle curve. Therefore, when the guide rollers 46 roll on the inclined guide surfaces 47b of the cam plates 47, the four-bar linkage mechanisms 44 rotate vertically (incline) around the axles 44c and 44b in correspondence with the inclination of the inclined guide surfaces 47b, so that the auxiliary base 45 supported by the four-bar linkage mechanisms 44, and by extension the seat main body 10 ascend or descend between a raised position and a lowered position. The four-bar linkage mechanism 44, the guide rollers 46 and the cam plate 47 described above form a raising/lowering mecha-nism 48 for the seat main body 10, and the raising/lowering mechanism 48 thus constructed and the widthwise slide mechanism 43 form the raising/lowering device 40. The guide rollers 46 described above correspond to supported portions in the present invention, and the cam plates 47 correspond to ascent/descent guide members in the present invention.

The stopping of the seat main body 10 at the lowered position, i.e., the stopping of the widthwise slide base 41 at the advanced position, is performed by a pulse signal from a limit switch (not shown) or the electric motor 42a. However, if there is any abnormality in these components, a so-called overrun occurs. Consequently, stopper portions 47c for preventing so-called overruns are integrally formed in end portions of the inclined guide surfaces 47b of the cam plates 47. The stopper portions 47c abut the guide rollers 46, thereby preventing the guide rollers 46 from excessively moving beyond a predetermined moving amount.

Figure 10:
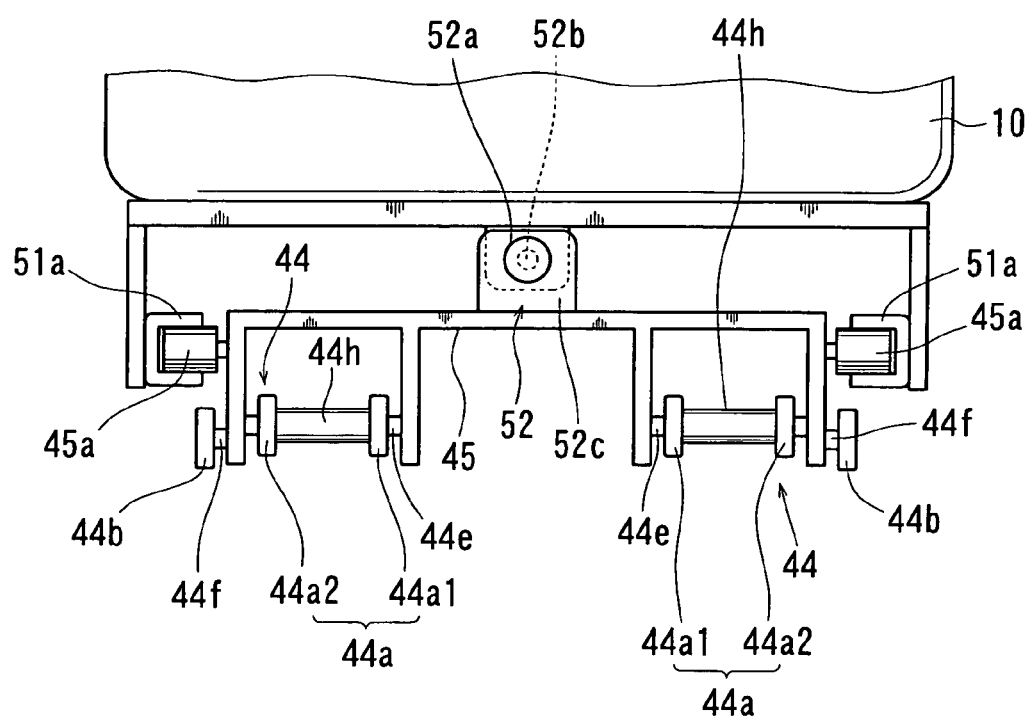
FIG. 10 is a diagram viewed from a front side.
Figure 11:
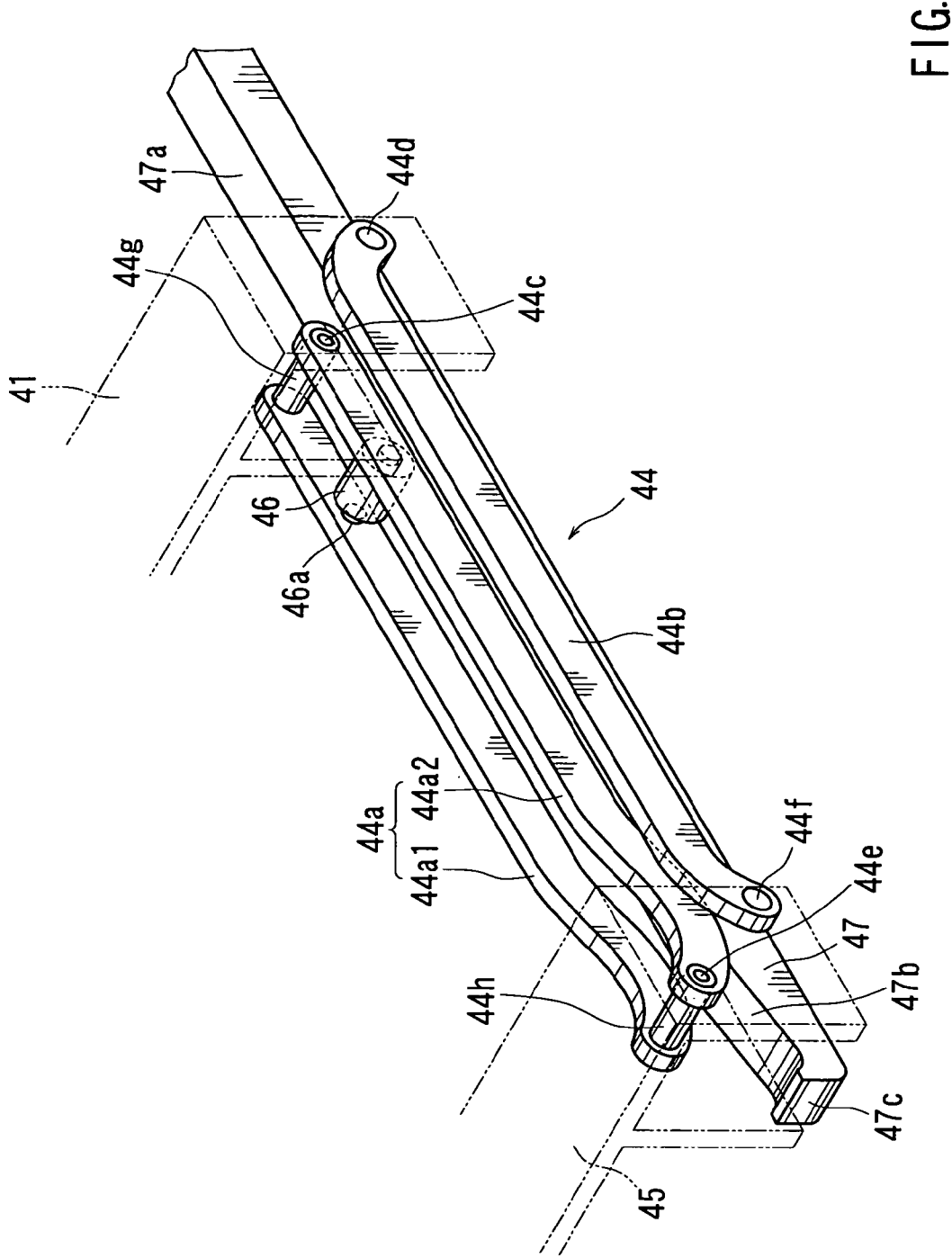
FIG. 11 is a perspective view of a left-side upper link arm and a left-side lower link arm of a four-bar linkage mechanism.

Further, in this embodiment, each of the upper link arms 44a of the link arms forming the four-bar linkage mechanisms 44 is composed of two plates 44a1 and 44a2 that are arranged at a predetermined interval and are connected to each other. That is, as shown in FIGS. 6, 10, and 11, the two plates 44a1 and 44a2 are arranged at a predetermined interval along a direction crossing the moving direction of the widthwise slide base 41 and are interconnected via a cylindrical bearing 44g disposed at one end and a cylindrical bearing 44h disposed at the other end. As a result, the upper link arm 44a is composed of the two plates 44a1 and 44a2 and may have a relatively high rigidity. End portions of the axle 44c that is inserted into the bearing 44g are connected to the side portions of the widthwise slide base 41, and both end portions of the axle 44e that is inserted into the other bearing 44h are connected to the side portions of the auxiliary base 45. As a result, the upper link arm 44a is rotatable with respect to the widthwise slide base 41 and the auxiliary base 45. The bearings 44g and 44h described above correspond to connecting members described in claim 7 of the present invention. Also, the guide roller 46, previously described, is disposed between the two plates 44a1 and 44a2, and respective end portions of a roller shaft 46a are supported by the two plates 44a1 and 44a2.

Figure 9:
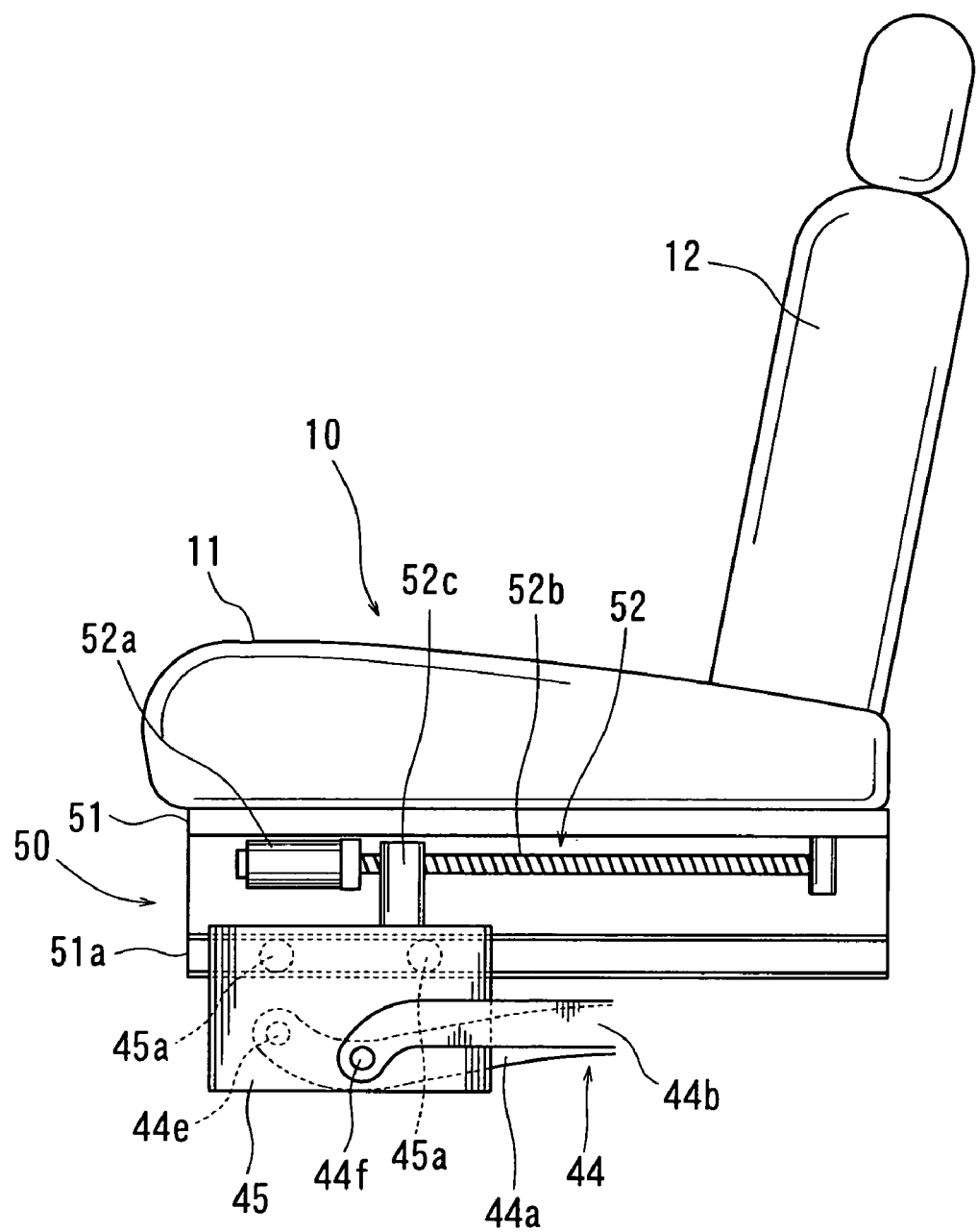
FIG. 9 is a diagram schematically illustrating the slide structure of a seat support base, which is viewed from the lateral side.

A seat support base 51 supporting the seat main body 10 is provided to the upper surface side of the auxiliary base 45 so as to be slidable in the vehicle width direction (in the same direction as the widthwise slide base 41). FIG. 9 is a diagram schematically illustrating the slide structure of the seat support base 51, which is viewed from a lateral side. FIG. 10 is a diagram viewed from a front side. As shown in the drawings, the lower surface of the seat support base 51 is provided with two slide rails 51a that are parallel to each other. The slide rails 51a are slidably supported by a plurality of guide rollers 45a that are rotatably attached to the auxiliary base 45. Provided between the auxiliary base 45 and the seat support base 51 is an auxiliary slide driving device 52 that has an electric motor 52a as an auxiliary slide drive source, a screw shaft 52b and a nut 52c. By actuating the electric motor (auxiliary slide motor) 52a of the auxiliary slide driving device 52 so that the screw shaft 52b meshing with the nut 52 is rotated, the seat main body 10 can be moved in the vehicle width direction with respect to the auxiliary base 45. The guide rollers 45a, the seat support base 51, the slide rails 51a and the auxiliary slide driving device 52 described above constitute an auxiliary slide mechanism 50 for the seat main body 10.

In this way, the seat main body 10 is moved in two stages in the vehicle width direction by the widthwise slide mechanism 43 and the auxiliary slide mechanism 50.

In this case, the movement of the seat main body 10 by the auxiliary slide mechanism 50 is a horizontal movement in the vehicle width direction, whereas as stated above, the movement thereof by the widthwise slide mechanism 43 involves displacements in the vehicle width direction and the vertical direction. That is, when the widthwise slide base 41 is moved from the retreated position to the advanced position, the four-bar linkage mechanisms 44 rotate downwardly while moving to the exterior of the vehicle cabin, and the auxiliary base 45, and by extension the seat main body 10, moves (descends) from a raised position to a lowered position along an arcuate path. Conversely, when the widthwise slide base 41 is moved from the advanced position to the retreated position, the four-bar linkage mechanisms 44 upwardly rotates while moving to the interior of the vehicle cabin, and the seat main body 10 is returned to a raised position from a lowered position along an arcuate path.

The vehicle seat moving apparatus 1 thus constructed moves from the interior to the exterior of the vehicle cabin, as described below, so that a seated person can exit from the vehicle cabin.

First, in a seating position in which the seated person faces the front side of the vehicle as indicated by a chain double-dashed lines in FIG. 1, the electric motor 24a for longitudinal sliding is normally actuated and the seat main body 10 slides forward relative to the vehicle. Further, the electric motor 32 for rotation is actuated and the seat main body 10 rotates by approximately 90 degrees toward the door opening K while sliding forwards relative to the vehicle. Further, in this embodiment, the electric motors 24a and 32 are controlled such that the electric motor 24a for longitudinal sliding is actuated after the seat main body 10 is rotated by approximately 43 degrees from the seating position toward the door opening K, so that the rotating operation and the longitudinal sliding operation can be simultaneously performed. FIG. 8 shows different moving positions of the seat main body 10 that is moved by the cam plates 47. Positions (A), (B) and (C) respectively correspond to the raised position, an intermediate position and the lowered position.

In a condition that the seat main body 10 faces the door opening K, the electric motor 52a for auxiliary sliding is actuated so that the seat main body 10 is horizontally moved to the exterior of the vehicle cabin via the door opening K. This condition is shown in FIG. 3. The seat main body 10 moved by the auxiliary slide mechanism 50 passes through the door opening K under this condition.

Thereafter, the electric motor 42a of the widthwise slide mechanism 43 is actuated so that the widthwise slide base 41 moves from the retreated position toward the advanced position. As a result, the seat main body 10 further moves to the exterior of the vehicle cabin by the four-bar linkage mechanisms 44. A movement path at this time is determined by the configuration of the cam surfaces of the cam plates 47. In this embodiment, because the cam plates 47 are formed with the horizontal guide surfaces 47a, the seat main body is substantially horizontally moved until the guide rollers 46 pass the horizontal guide surfaces 47a. Once the guide rollers 46 pass the horizontal guide surfaces 47a, the four-bar linkage mechanisms 44 then rotate downwardly in correspondence with the inclination of the inclined guide surfaces 47b so that the seat main body 10 is moved from a raised position to a lowered position. This condition is shown in FIG. 4.

In this condition, the seat main body 10 is moved to the exterior of the vehicle cabin over a sufficient distance and is lowered to a level close to the ground surface. Therefore, the seated person can be easily transferred to, for example, a wheelchair that is placed alongside of the seat main body 10.

After the seated person has left the seat main body 10 upon completion of the transferring, the seat main body 10 is returned to the interior of the vehicle cabin by an operation reverse to the above described operation. Further, when a person is getting into the car, after the person transfers to and sits upon the seat main body 10 that has been moved to the exterior of the vehicle cabin, the seat main body 10 is returned to the seating position in the interior of the vehicle cabin by an operation reverse to the above. During this operation, the seated person may remain seated on the seat main body 10. This may remarkably reduce the labor of the seated person and any helpers for the seated person.

Figure 17:
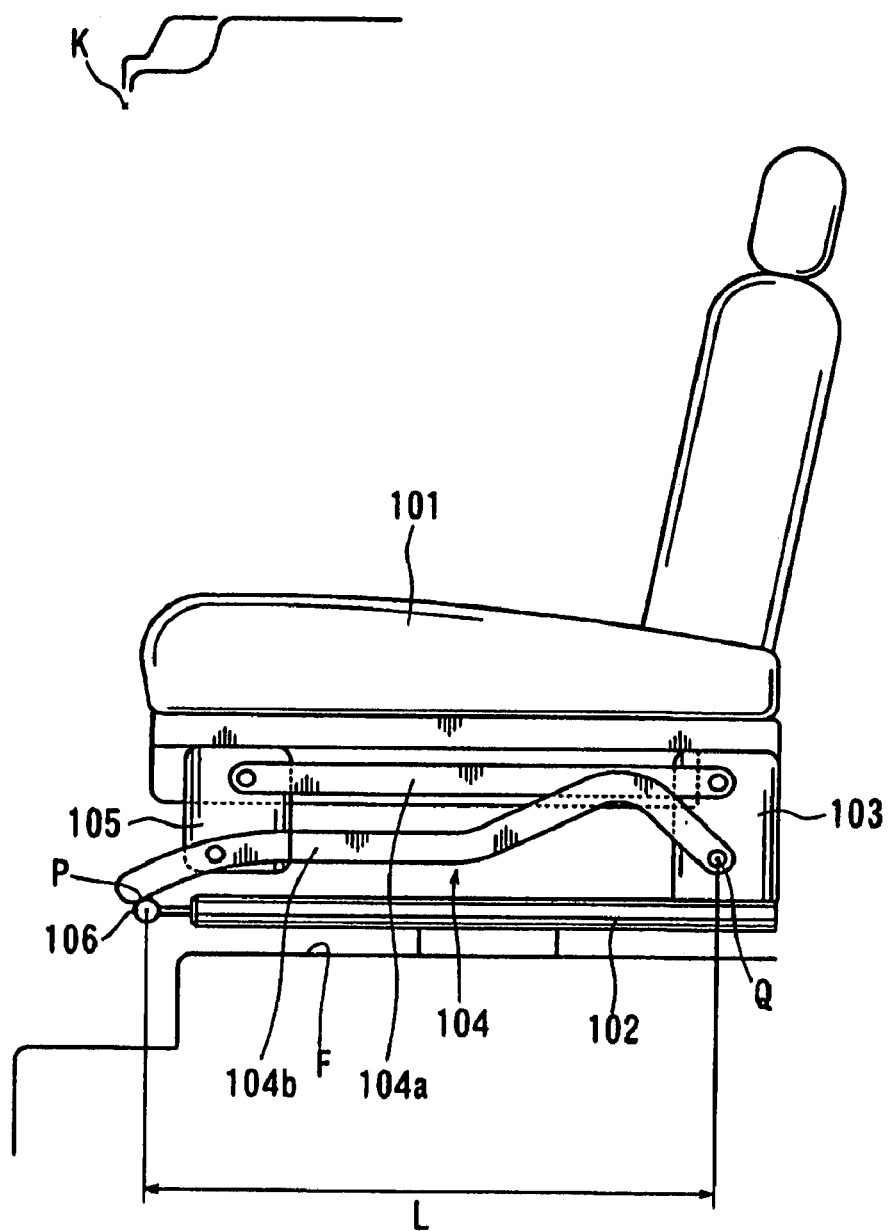
FIG. 17 is a diagram illustrating a conventional vehicle seat moving apparatus.

Incidentally, as shown in FIG. 17, the conventional raising/lowering device is constructed such that the lower link arm 104b of each four-bar linkage mechanism 44 rotates while sliding on the ascent/descent guide pin 106. Therefore, the distance L between the rotation center Q and the fulcrum P of the lower link arm 104b varies with the movement of the slide base 103. As a result, a load applied to the electric motor for moving the slide base 103 fluctuates greatly.

In contrast, as shown in FIGS. 7 and 8, in the raising/lowering device 40 of the vehicle seat moving apparatus 1 of the present embodiment, the guide roller 46 is mounted on the upper link arm 44a of each four-bar linkage mechanism 44, and the guide roller 46 rolls on the cam surface of the cam plate 47. Therefore, during the movement of the widthwise slide base 41, the distance L from a rotation center Q of the upper link arm 44a to the fulcrum P (an abutment point of the cam plate 47 and the guide roller 46) of the upper link arm 44a is maintained as a constant. Thus, if the load applied to the electric motor 42a fluctuates when the guide roller 46 rolls on the inclined guide surface 47b of the cam plate 47, the range of fluctuation is smaller than the range in the prior art. Further, such load fluctuation occurs gently. As a result, the burden on the electric motor 42a is reduced. This may lead to improved durability of the electric motor 42a. Also, the movement path of the seat main body 10 between the raised position and the lowered position is determined based on the cam configuration of the cam plates 47. Therefore, it is possible to design a smooth movement path.

Further, in this embodiment, each cam plate 47 has a horizontal guide surface 47a on which the guide roller 46 moves horizontally when the widthwise slide base 41 is moved from the advanced position to the retreated position. Therefore, in the condition that the widthwise slide base 41 is moved to the retreated position, the guide rollers 46 are retained on the horizontal guide surfaces 47a of the cam plates 47. As a result, it possible to retain the seat main body 10 at a raised position without applying any load to the electric motor 42a for widthwise sliding.

Further, the cam plates 47 have the stopper portions 47c that are formed at the ends of the inclined guide surfaces 47b. The stopper portions 47c abut the guide rollers 46 when the guide rollers 46 moves obliquely downwards on the inclined guide surfaces 47b, thereby preventing the guide rollers 46 from further movement. Thus, due to the stopper portions 47c, it is possible to prevent an overrun of the upper link arms 44a, and by extension the seat main body 10. Further, the stopper portions 47c can be easily formed when the cam plates 47 are manufactured. Also, it is possible to reduce the number of parts as compared with, for example, a case in which the movement of the widthwise slide base 41 is restrained by utilizing a separately formed stopper.

Further, the seat main body 10 is lowered after it is moved to the exterior of the vehicle cabin by the auxiliary slide mechanism 50. Therefore, the distance of movement to the exterior of the vehicle cabin can be increased. As a result, the seat main body 10 can be lowered to a level still closer to the ground surface. This may also lead to easy transferring of the seated person between the seat main body 10 and, for example, the wheelchair.

Further, in this embodiment, each of the right and left upper link arms 44*a* is constructed of the two plates 44*a*1 and 44*a*2 that are interconnected via cylindrical bearings 44*g* and 44*h*. Thus, when compared with a case in which the upper link arms are constructed of a single plate, it is possible to reduce the arm width (a vertical dimension) of each of the plates 44*a*1 and 44*a*2 while ensuring the required strength for the upper link arm 44*a*. As a result, each four-bar linkage mechanism 44 can be downsized as a whole with respect to the height direction. It is effective to minimize the overall height of the seat main body 10 when the four-linkage mechanisms 44 are arranged so as to be positioned on the lower surface of the seat main body 10.

Further, the upper link arm 44*a*, constructed as described above, provides an increased rigidity with respect to a plate thickness direction (a direction along the arrangement of the plates 44*a*1 and 44*a*2) as well as a stable support structure in which both ends of the axles 44*c* and 44*e* are respectively supported by the widthwise slide base 41 and the auxiliary base 45. Further, the guide roller 46 has a both end supported stable support form in which the ends of the roller shaft 46*a* are respectively supported by the plates 44*a*1 and 44*a*2. This makes it possible to eliminate or reduce the rolling of the seat main body 10 during its ascent/descent or horizontal movement.

Next, a second embodiment of the present invention will be described with reference to FIGS. 12 and 13. The second embodiment is a modified form with respect to the raising/lowering mechanism 48 in the first embodiment described above. In the first embodiment, each cam plate 47 has a horizontal guide surface 47*a* which guides the guide roller 46 provided to the upper link arm 44*a* so as to move the same horizontally and has the inclined guide surface 47*b* which guides the guide roller 46 so as to move the same obliquely downwards along the predetermined path. That is, the upper link arm 44*a* has an ascent/descent movement region in which it is vertically rotated and has a horizontal movement region which does not involve vertical rotation. In the ascent/descent movement region, the upper link arm 44*a* is guided by the inclined guide surface 47*b* of the cam plate 47. In the horizontal movement region, the upper link arm 44*a* is guided by the horizontal guide surface 47*a* of the cam plate 47.

In the above-described construction, an upward force (which will be hereinafter referred to as a "raising force") as a reaction force of a load from the side of the seat main body 10 is applied to an arm support portion of the widthwise slide base 41, which portion is the rotation center of the upper link arm 44*a*. This raising force is inversely proportional to the distance L from the rotation center Q to the fulcrum P (an attaching position of the guide roller 46). Therefore, in order to reduce the raising force, it is desirable to position the fulcrum P away from the rotation center Q. However, in order to ensure a sufficient rotation angle, the cam plate 47 must be downwardly extended. Consequently, in order to prevent interference during rotation of the seat main body 10, the entire height of the device must be increased. Thus, an attempt to position the fulcrum P away from the rotation center Q has inherent limitations.

Consequently, the second embodiment is provided in order to reduce the raising force acting on the widthwise slide base 41 when the widthwise slide base 41 moves.

Figure 12:
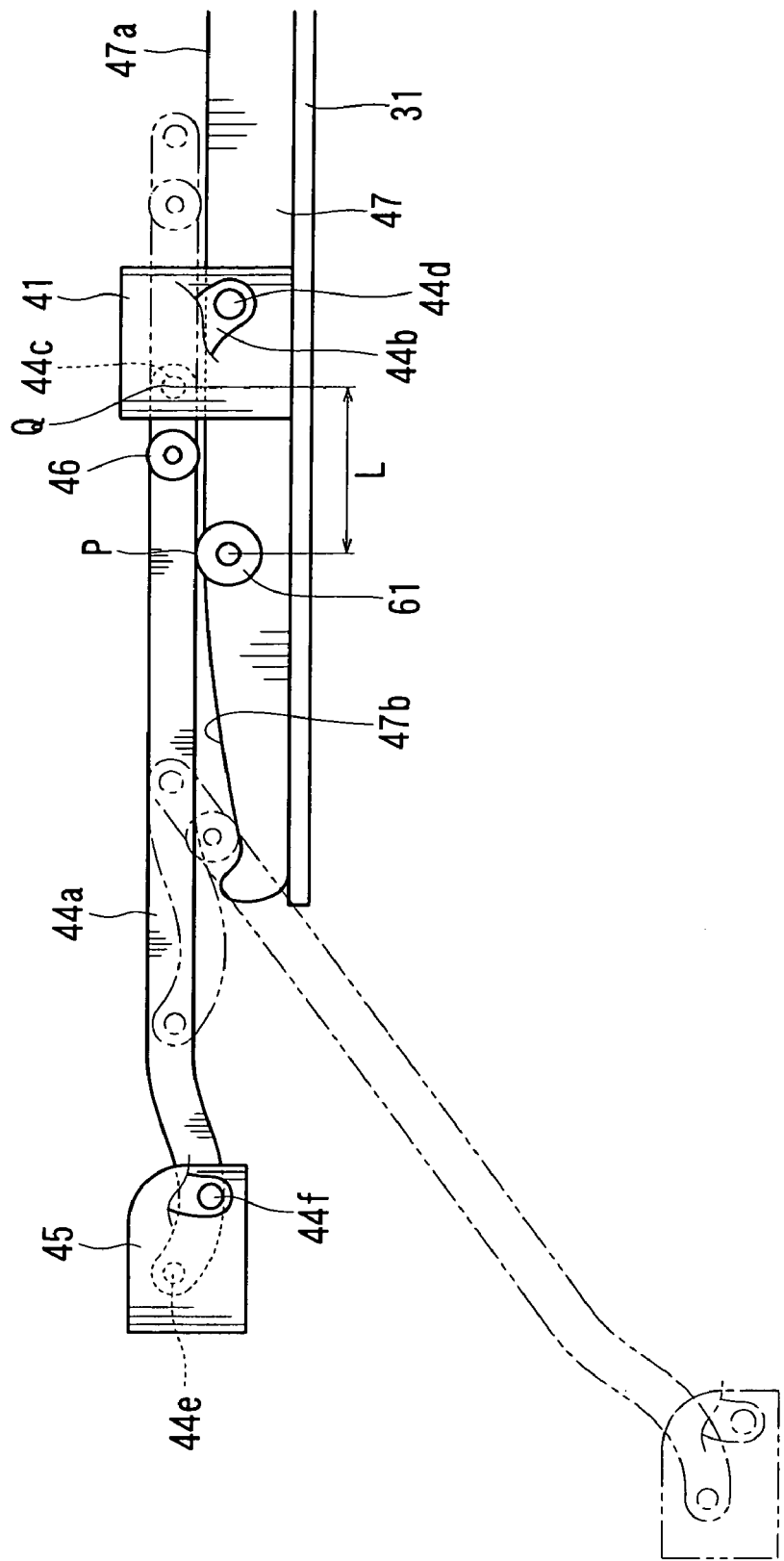
FIG. 12 is a diagram illustrating a raising/lowering mechanism for a seat main body according to a second embodiment of the present invention, which is viewed from a lateral side.
Figure 13:
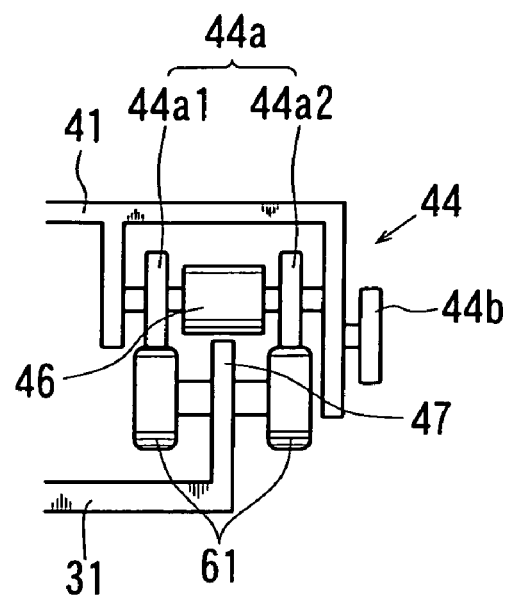
FIG. 13 is a diagram viewed from a front side.

FIG. 12 is a side view of the raising/lowering mechanism 48 for the seat main body 10. FIG. 13 is a rear view of the same. Further, in FIG. 12, the lower link arm 44*b*, which is not directly pertinent, is omitted, and mainly the upper link arm 44*a* is shown. As shown in the drawings, in the second embodiment, an auxiliary roller 61 is provided as a horizontal retaining member which directly supports the lower surface of the upper link arm 44*a* and guides the upper link arm 44*a* so as to horizontally move the same. The auxiliary roller 61 is attached to the side surface of the cam plate 47 so as to be rotatable at a fixed position. The auxiliary roller 61 is positioned near the boundary between the horizontal guide surface 47*a* and the inclined guide surface 47*b*.

That is, in the second embodiment when the widthwise slide base 41 is moved between the retreated position and the advanced position, in the movement of the upper link arm 44*a* in the horizontal movement region the upper link arm 44*a* is guided by the auxiliary roller 61, and in the movement of the upper link arm 44*a* in the ascent/descent movement region, the upper link arm 44*a* is guided by rolling the guide roller 46 on the inclined guide surface 47*b* of the cam plate 47, as in the first embodiment. Further, other constructions are the same as in the first embodiment.

In FIG. 12, in the condition in which the widthwise slide base 41 is moved to the advanced position side and the seat main body 10 (which is omitted in FIGS. 12 and 13) is moved to a lowered position (which is indicated by the chain double-dashed lines), the guide roller 46 is guided by the inclined guide surface 47*b* of each cam plate 47. In this condition, the upper link arm 44*a* is spaced apart from the auxiliary roller 61. When the widthwise slide base 41 moves from the advanced position toward the retreated position, the guide roller 46 rolls upwards along the inclined guide surface 47*b*, and as the rotation center of the upper link arm 44*a* moves past the auxiliary roller 61 toward the horizontal guide surface 47*a*, the upper link arm 44*a* is brought closer to a horizontal posture while upwardly rotating. Then, the lower surface of the upper link arm 44*a* begins to come into contact with the auxiliary roller 61. When the widthwise slide 41 further moves toward the retreated position in this condition, the guide roller 46 is disengaged from the horizontal guide surface 47*a* of the cam plate 47. As a result, the upper link arm 44*a* is supported by the auxiliary roller 61 so that the fulcrum P of the upper link arm 44*a* moves onto the auxiliary roller 61. This condition is indicated by a solid lines in FIG. 12. Thereafter, as indicated by the chain double-dashed lines, the upper link arm 44*a* is moved while maintaining the horizontal posture until the widthwise slide base 41 reaches the retreated position.

When the widthwise slide base 41 is moved from the retreated position to the advanced position side, the upper link arm 44*a* is moved horizontally while being supported by the auxiliary roller 61. However, when the rotation center of the upper link arm 44*a* moves past the auxiliary roller 61 toward the side of the inclined guide surface 47*b*, the upper link arm 44*a* is rotated downwards, and as a result, the guide roller 46 is placed on the inclined guide surface 47*b* of the plate 47. Thus, the fulcrum of the upper link arm 44*a* is switched from the auxiliary roller 61 to the inclined guide surface 47*b* of the cam plate 47 (the guide roller 46).

In this way, in the second embodiment the movement region of the upper link arm 44*a* includes the ascent/descent movement region in which the upper link arm 44*a* is guided by the cam plate 47 and moves while being vertically rotated, and the horizontal movement region in which the upper link arm 44*a* is guided by the auxiliary roller 61 and moves without involving any vertical rotation. When the upper link arm 44*a* is moving in the horizontal movement region, the auxiliary roller 61 is located near the side of the inclined guide surface 47*b* of the cam plate 47 with respect to the guide roller 46, i.e., the side near the door opening. The inclined guide surface 47*b* side corresponds to an advanced side in claim 4.

According to the second embodiment constructed as described above, when the upper link arm 44*a* moves in the horizontal movement region the distance L from the rotation center Q to the fulcrum P can be increased. This makes it possible to reduce the raising force that acts on the arm support portion of the widthwise slide base 41. As a result, it is possible to reduce the load on the electric motor 42*a* for moving the widthwise slide base 41. Also it is possible to prevent twisting of the widthwise slide base 41, thereby ensuring a smooth movement thereof. Further, it is possible to minimize deflection of the link mechanism or other such members, thereby preventing mutual interference of the members. In addition, the horizontal guide surface 47*a* of the cam plate 47 can be omitted.

While in the second embodiment, the horizontal retaining member is composed of the rotatable auxiliary roller 61, it may be replaced with a non-rotatable member.

Figure 14:
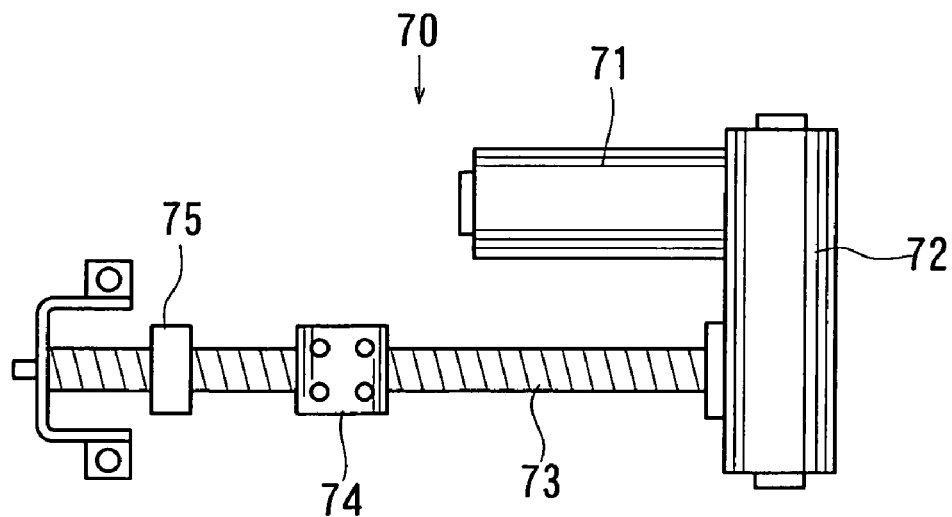
FIG. 14 is a diagram showing a widthwise driving device according to a third embodiment of the present invention.

Next, a third embodiment of the present invention will be described with reference to FIGS. 14-16. In the first embodiment described above, the stopper portion 47*c* is formed at the forward end of each cam plate 47 in order to prevent a so-called overrun at the time that the seat main body 10 moves to the lowered position. However, in such a construction, the impact caused by abutment of the guide roller 46 and the stopper portion 47*c* at the time of overrun can be broadly transmitted to the members such as the upper link arm 44*a*, the cam plate 47, and the widthwise slide base 41, as well as various other members such as the screw shaft 42*b* and the nut 42*c*, which function as the driving device for the widthwise slide base 41.

Consequently, the third embodiment is provided in order to prevent broad transmission of the impact that is generated due to prevention of the overrun of the seat main body 10 when the seat main body 10 moves to a lowered position.

In the third embodiment, a driving device 70 for widthwise sliding, which moves the widthwise slide base 41 (which is not shown in FIGS. 14-16), is equipped with an overrun preventing means. As shown in FIG. 14, the driving device 70 for widthwise sliding is composed of an electric motor 71 as a drive source, a screw shaft 73 rotated by the electric motor 71 via a reduction gear 72, and a movable nut 74 meshing with the screw shaft 73 or other such components. For example, the electric motor 71, the reduction gear 72, and the screw shaft 73, are attached to the side of the widthwise slide base 41, and the movable nut 74 is attached to the rotation base 31 side. The screw shaft 73 is equipped with a stationary nut 75 which serves as a means for preventing the overrun of the seat main body 10 when it is moved to a lowered position. The stationary nut 75 is mounted so as not to be movable with respect to the screw shaft 73. The stationary nut 75 corresponds to a stopper member in the present invention.

As described with regard to the first embodiment, the stopping of the seat main body 10 at the lowered position, i.e., the stopping of the widthwise slide base 41 at the advance position, is performed by a pulse signal from a limit switch (not shown) or the electric motor 71. However, if there is any abnormality in these components, an overrun occurs.

Figure 15:
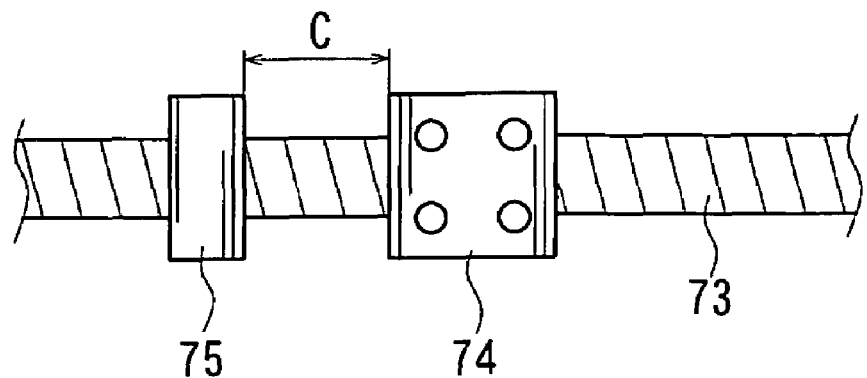
FIG. 15 is a diagram showing a normal stopping condition.
Figure 16:
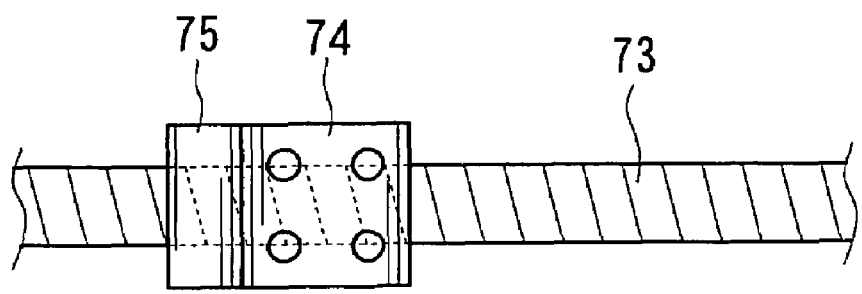
FIG. 16 is a diagram showing a condition in which overrun has occurred.

FIG. 15 shows a normal stopping condition in which the seat main body 10 is stopped at a predetermined lowered position. In this condition, the movable nut 74 and the stationary nut 75 are opposed to each other with a predetermined interval C therebetween. FIG. 16 shows an overrun condition in which the seat main body 10 is excessively moved over the predetermined lowered position. In this condition, the movable nut 74 and the stationary nut 75 abut each other, thereby limiting the movement of the seat main body 10.

In this way according to the third embodiment, at the time of overrun the stationary nut 75 fixed to the screw shaft 73 and the movable nut 74 abut each other. Therefore, a reaction force is applied solely to the screw shaft 73 and the reduction gear 72 that is provided between the screw shaft 73 and the electric motor 71. That is, the reaction force is not applied to other components. As a result, it is possible to prevent the driving device from damaging by appropriately setting the strength of the screw shaft 73 and the reduction gear 72 as well as the motor torque. Further, at the time of overrun, the stopping is effected within the limits of the extension of the screw shaft 73. As a result, the stopping can be effected within a reduced overrun than as compared with the prior art structure.

The present invention is not restricted to the above-described embodiments and can be practiced in modified forms.

For example, although the vehicle seat moving apparatus 1 that is applied to a passenger seat is exemplified and described, its application is not limited to the passenger seat. Further, with regard to the construction in which the seat main body 10 is moved in the longitudinal direction by a longitudinal movement mechanism 20, the construction in which the seat main body 10 is rotated by a rotation mechanism 30, and the construction in which the seat main body 10 is horizontally moved in the vehicle width direction by an auxiliary slide mechanism 50, one or two or all of the mechanisms can be omitted.

Further, the seat raising/lowering arm in the present invention is not restricted to the four-bar linkage mechanism 44. Also, the cross-sectional configuration of the cam plate 47 as an ascent/descent guide member is not limited to the vertically elongated rectangular configuration. The guide roller 46 may also be provided to the lower link arm 44*b*. The supported portion may also be constructed from a component other than the guide roller 46. Further, while the upper link arm 44*a* of the four-bar linkage mechanism 44 is constructed from the two plates 44*a*1 and 44*a*2, it can be formed by a single plate.

Further, the third embodiment is applied to the movement of the seat main body 10 towards a lowered position, i.e., the prevention of the overrun when the widthwise slide base 41 is in the advanced position. However, the teachings of the third embodiment can be applied to, for example, the movement of the longitudinal slide base 23 and the seat support base 51.

According to the invention described above, it is possible to provide a technique which is effective in reducing the range of fluctuation of the load applied to the drive source when the seat main body in the vehicle seat moving apparatus 1 is moved between a raised position and a lowered position. As a result, it is possible to reduce the load applied to the drive source and to increase the durability thereof.

Next, a vehicle seat moving apparatus 201 according to a fourth embodiment of the present invention will be described, in which an apparatus is further modified from the vehicle seat moving apparatus 1 of the first embodiment described above. In the vehicle seat moving apparatus 201 of the fourth embodiment, the horizontal guide surface 47a and the inclined guide surface 47b of the cam plate 47 of the first embodiment are separated from each other. The vehicle seat moving apparatus 201 of the fourth embodiment will be hereinafter described in detail.

Figure 18:
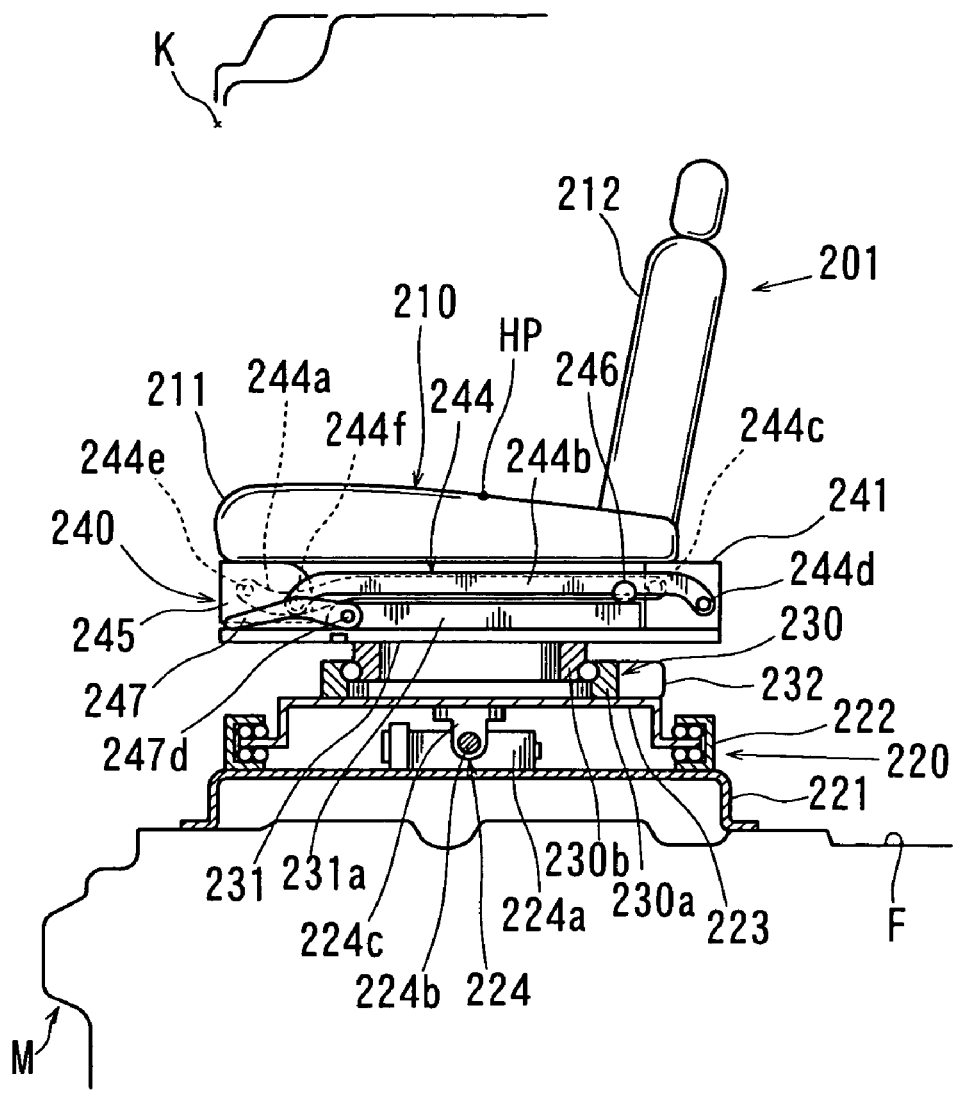
FIG. 18 is a rear view of a vehicle seat moving apparatus according to a fourth embodiment of the present invention, showing a condition in which a seat main body faces a door opening.
Figure 19:
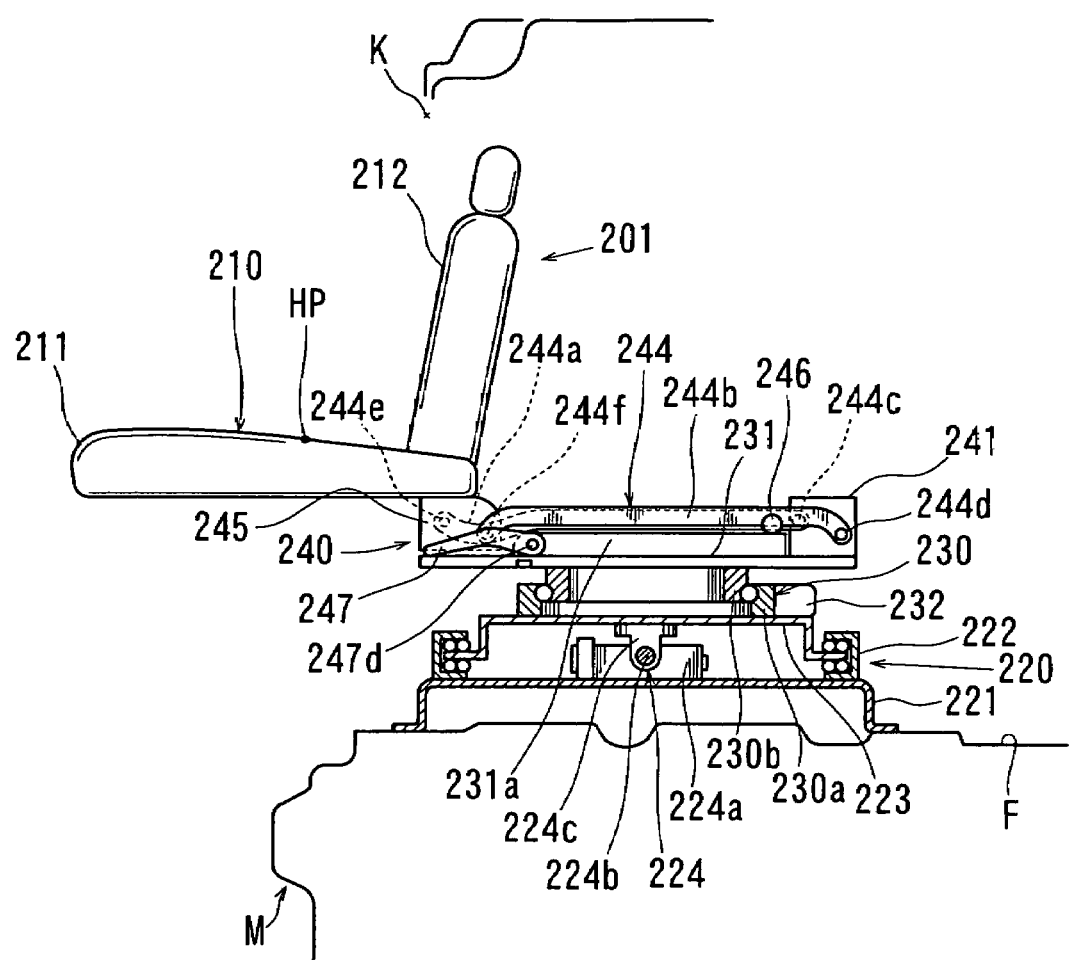
FIG. 19 is a rear view of the vehicle seat moving apparatus, showing a condition in which the seat main body is moved to the exterior of the vehicle cabin by an auxiliary slide mechanism.
Figure 20:
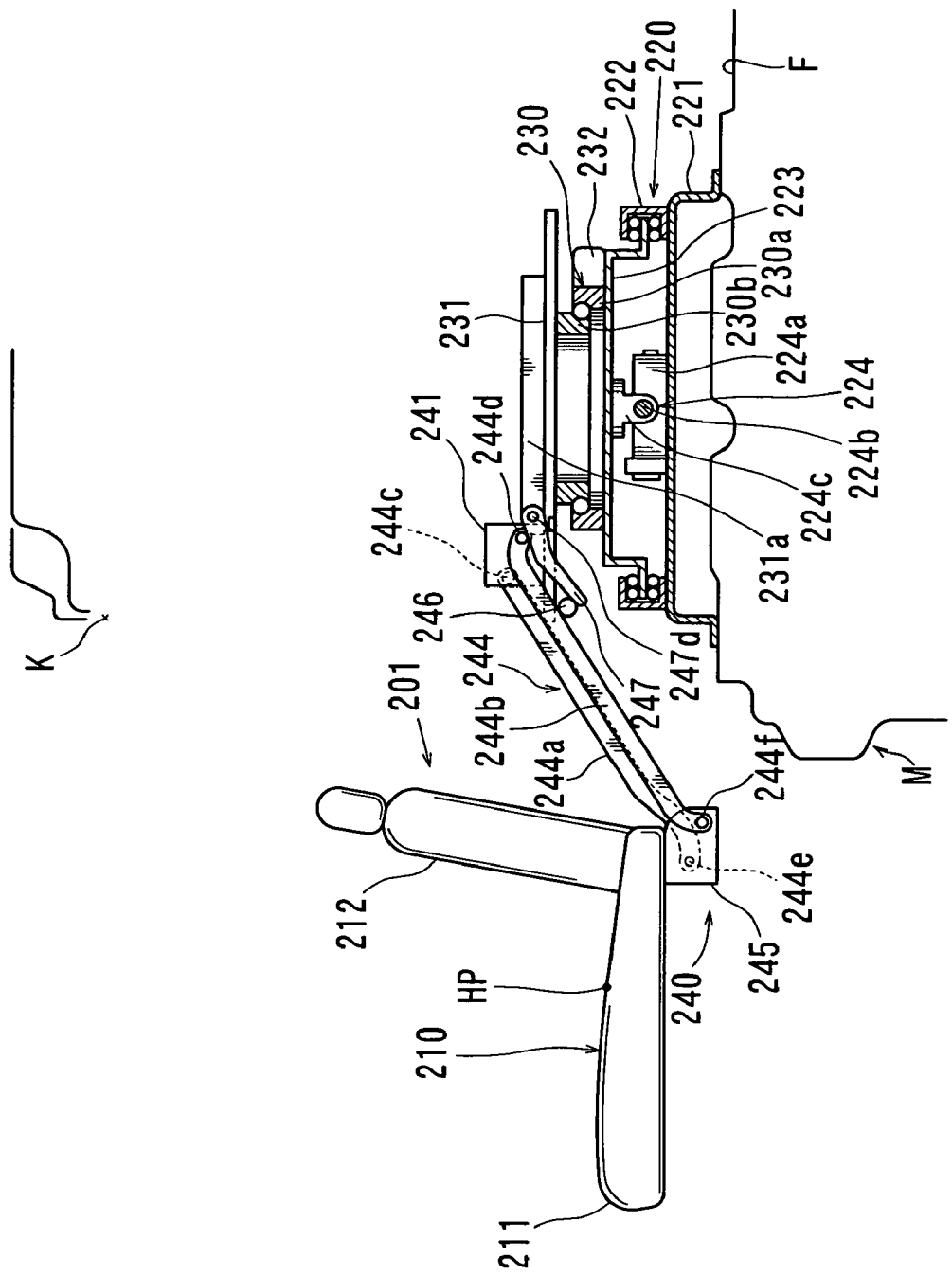
FIG. 20 is a rear view of the vehicle seat moving apparatus, showing a condition in which the seat main body is moved to the exterior of the vehicle cabin by a widthwise slide mechanism while it is lowered to a level close to the ground surface.

As shown in FIGS. 18-20, the vehicle seat moving apparatus 201 of the fourth embodiment includes a seat main body 210, a longitudinal movement mechanism 220 for moving the seat main body 210 in the longitudinal direction of the vehicle (a direction perpendicular to the planes of FIGS. 18-20), a rotation mechanism 230 for rotating the seat main body 210 between a position where it faces the front side of the vehicle and a position where it faces the door opening K, and a raising/lowering device 240 for moving (raising/lowering) the seat main body 210 facing the door opening K in the vehicle width direction between the interior and the exterior of the vehicle cabin via the opening K.

The longitudinal movement mechanism 220 has a stationary base 221 that is fixed to the floor F of the vehicle M. A longitudinal slide base 223 is provided to the upper surface of the stationary base 221 via guide rails 222 that are positioned in parallel with each other and are attached thereto, so as to horizontally slide in the longitudinal direction of the vehicle. Disposed between the stationary base 221 and the longitudinal slide base 223 is a longitudinal slide driving device 224 that has an electric motor 224a as the drive source for longitudinal movement, a screw shaft 224b, and a nut 224c. By actuating the electric motor 224a of the longitudinal slide driving device 224, the screw shaft 224b meshing with the nut 224c is rotated so that the longitudinal slide base 223 can be moved forwards or backwards in relation to the vehicle (in a direction perpendicular to the plane of the drawing).

Next, the rotation mechanism 230 has an outer ring 230a and an inner ring 230b that are combined so as to be coaxially rotatable relative to each other. The outer ring 230a is fixed to the upper surface of the longitudinal slide base 223. A rotation base 231 is fixed to the upper surface of the inner ring 230b. An electric motor 232, as a drive source for rotation, is mounted on the upper surface of the longitudinal slide base 223. The rotation output of the electric motor 232 is transmitted to the inner ring 230b via a gear transmission mechanism (not shown), thereby integrally rotating the rotation base 231, and by extension the raising/lowering device 240 that is disposed on the rotation base 231, and the seat main body 210.

Figure 21:
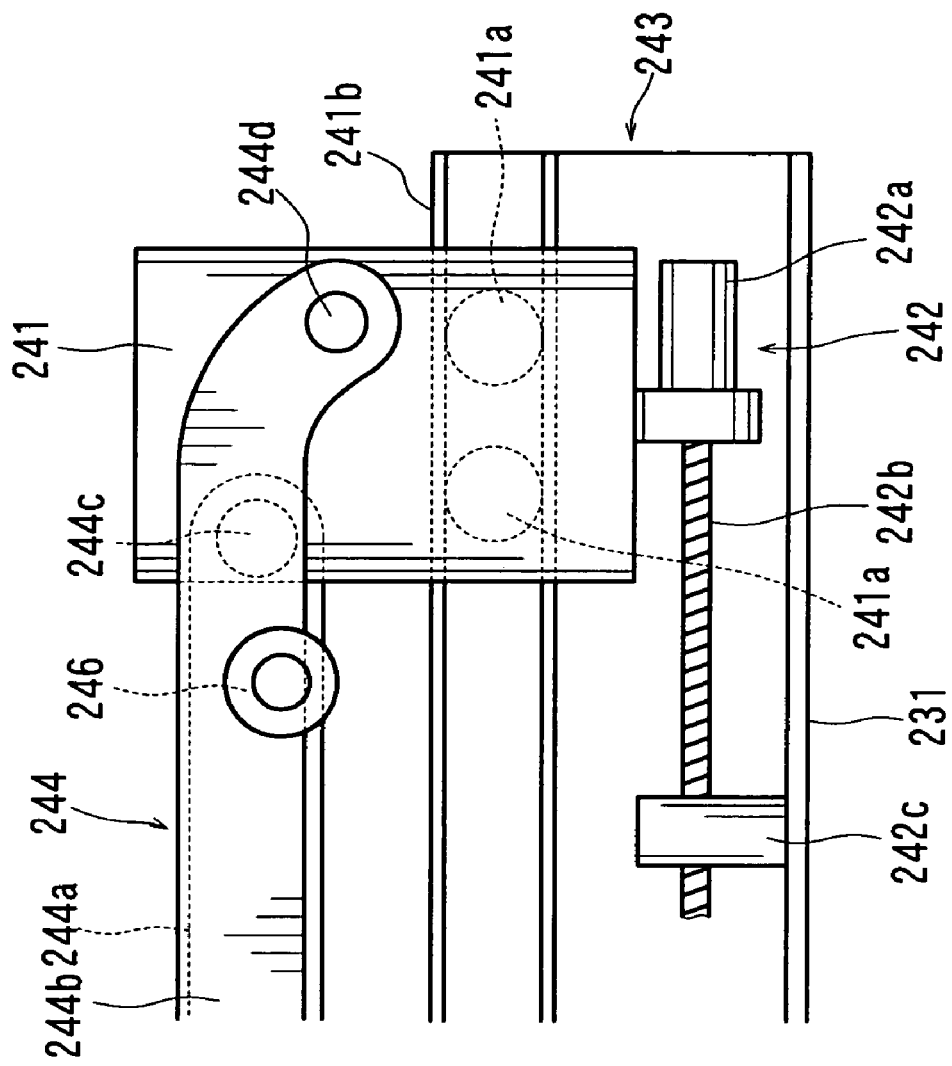
FIG. 21 is a diagram schematically illustrating the slide structure of a widthwise slide base, which is viewed from a lateral side.
Figure 22:
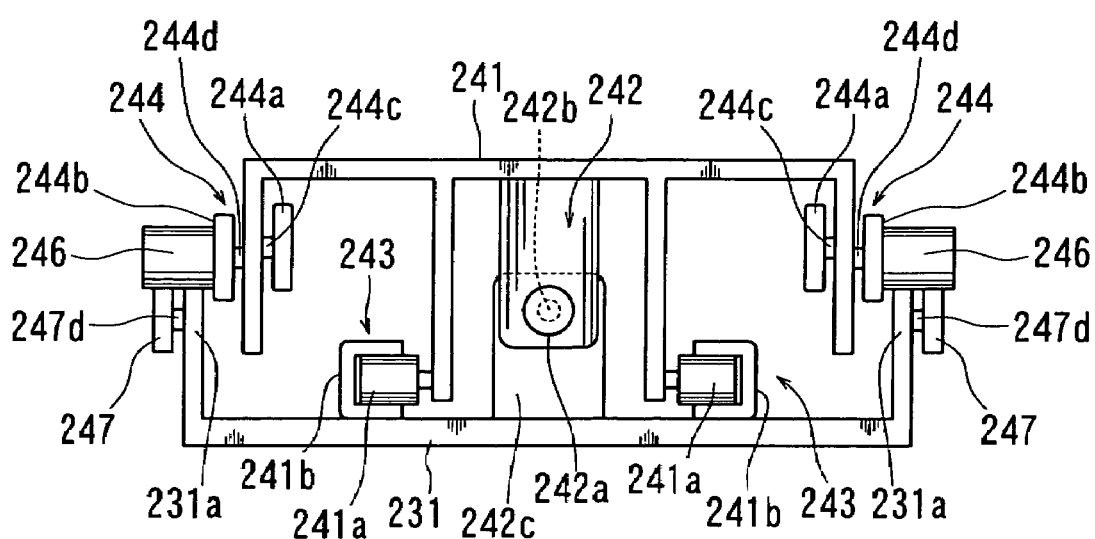
FIG. 22 is a diagram viewed from a rear side.

Next, the raising/lowering device 240 has a widthwise slide base 241 that is adapted to horizontally slide in the vehicle width direction (a lateral direction in FIG. 2) when the seat main body 210 faces the door opening K. The widthwise slide base 241 is arranged above the rotation base 231 of the rotation mechanism 230 and is slidably supported via slide rails 241b that are positioned in parallel with each other along the end edges of the rotation base 231 and are attached thereto. FIG. 21 is a diagram schematically illustrating the slide structure of the widthwise slide base 241, which is viewed from a lateral side, and FIG. 22 is a diagram viewed from a rear side. As shown in the drawings, the widthwise slide base 241 is slidable relative to each of the slide rails 241b via two slide rollers 241a. The slide rollers 241a are rotatably attached to the side surfaces of the widthwise slide base 241 at a fixed interval.

Further, provided between the widthwise slide base 241 and the rotation base 231 is a widthwise slide driving device 242 that has an electric motor 242a as the widthwise slide drive source, a screw shaft 242b, and a nut 242c. By actuating the electric motor 242a, the screw shaft 242b, meshing with the nut 242c, is rotated so that the widthwise slide base 241 can be moved between the retreated position spaced apart from the door opening K and the advanced position close to the door opening K. A widthwise slide mechanism 243 is constructed from the widthwise slide base 241, the slide rails 241b, the slide rollers 241a and the widthwise slide driving device 242. The widthwise slide base 241 corresponds to the slide base in the present invention.

Further, as shown in FIGS. 18-20, right and left four-bar linkage mechanisms 244 are respectively mounted on the both side portions of the widthwise slide base 241. Further, the expression "right and left" referred to herein means "right and left" under a condition in which the seat main body 210 faces the front side of the vehicle. Each of the four-bar linkage mechanisms 244 has an upper link arm 244a and a lower link arm 244b. Ends of the link arms 244a and 244b are respectively vertically rotatably supported by the side portions of the widthwise slide base 41 via axles 244c and 244d, and opposite ends thereof are rotatably connected to the side portions of an auxiliary base 45 via axles 244e and 244f. That is, the link arms 244a and 244b are supported by the widthwise slide base 241 at one end and support the auxiliary base 245 at the other end. Further, the upper link arms 244a and the lower link arms 244b are offset in the lateral direction (a direction of plate thickness) in order to prevent mutual interference thereof. The lower link arms 244b described above correspond to the seat raising/lowering arms described in the claims.

Figure 23:
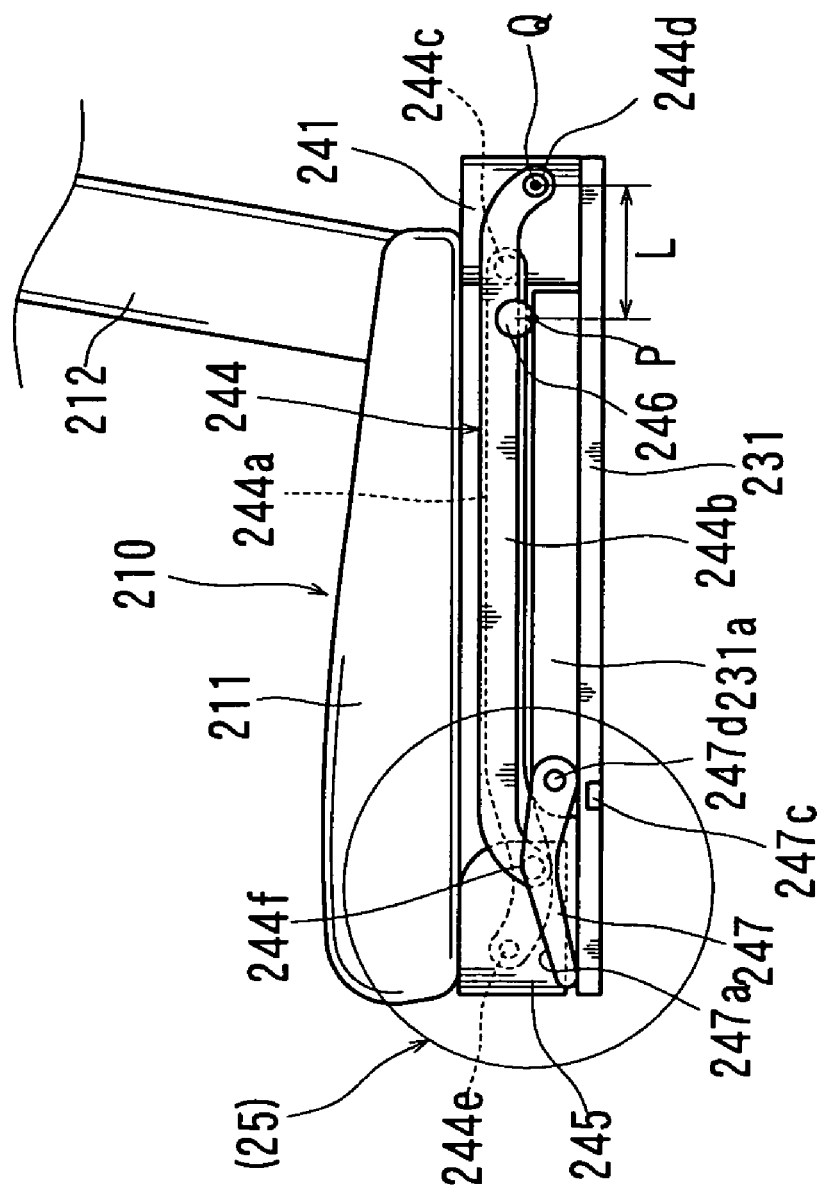
FIG. 23 is a diagram illustrating a raising/lowering mechanism for the seat main body.
Figure 24:
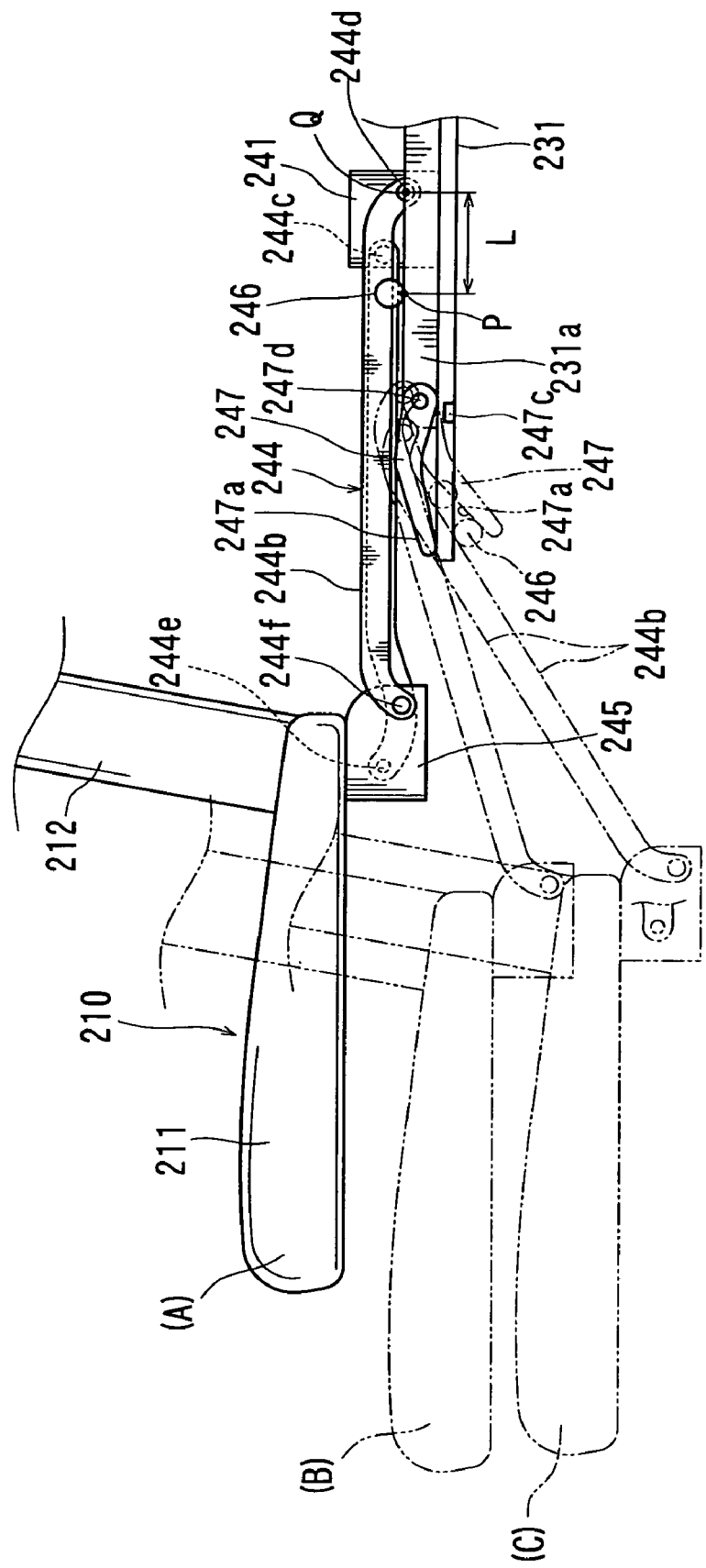
FIG. 24 is a diagram illustrating an operation mode of the raising/lowering mechanism.

FIG. 7 is a diagram illustrating a raising/lowering mechanism for the seat main body 210, which shows a condition in which the seat main body 210 is situated in the interior of the vehicle cabin. Also, FIG. 24 is a diagram illustrating an operation mode of the raising/lowering mechanism, which shows different moving positions of the seat main body 210. Positions (A), (B), and (C), respectively correspond to the raised position, the intermediate position and the lowered position. The right and left lower link arms 244b have guide rollers 246 that are positioned spaced apart by a predetermined distance L from the centers of the axles 244d, constituting the rotation centers thereof. As shown in FIG. 23, when the widthwise slide base 241 is in the retreated position, the guide rollers 246 are placed on the upper surfaces of the right and left guide rails 231a that are formed at the right and left sides of the rotation base 231.

The guide rails 231a are formed by upwardly bending the right and left end portions of the rotation base 231 and have a vertically elongated rectangular cross-sectional configuration. Their horizontal upper surfaces constitute rolling surfaces for the guide rollers 246. As shown in FIG. 24, cam plates 247 are attached to the forward ends of the guide rails 231a. When the widthwise slide base 241 is moved from the retreated position to the advanced position, the guide rollers 246 roll on the upper surfaces of the guide rails 231a, and during the course of movement, they are transferred from the guide rails 231a to the upper surfaces of the cam plates 247 attached to the forward ends of the guide rails 231a, i.e., cam surfaces 247a.

Figure 25:
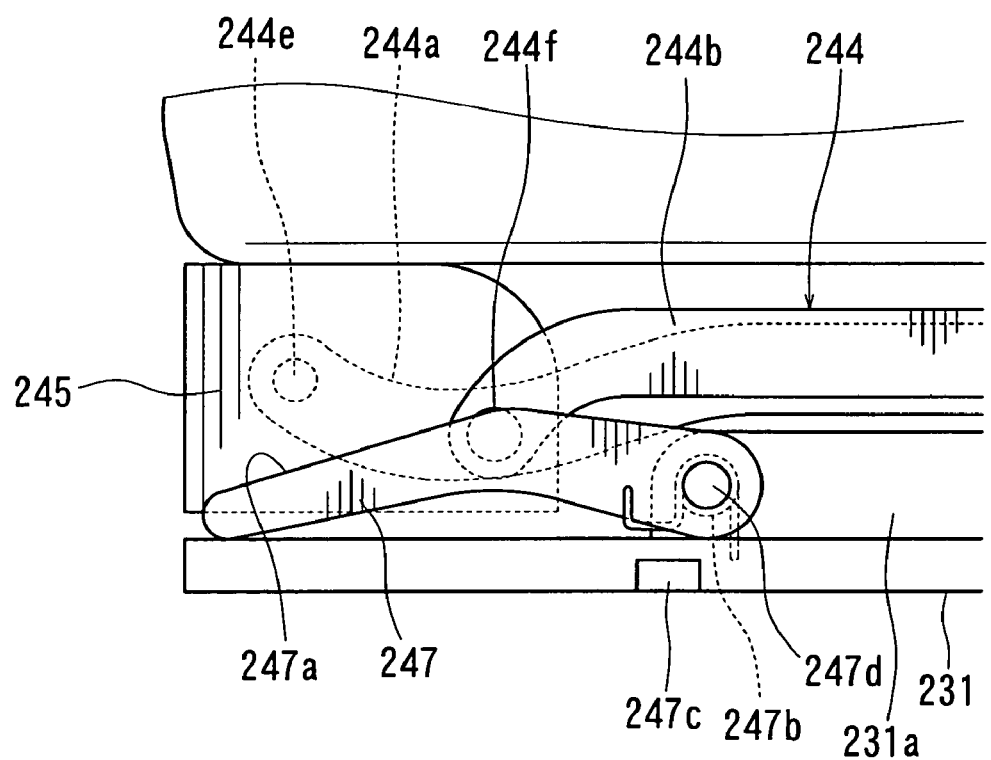
FIG. 25 is a detailed view of the portion (25) of FIG. 23.

One end (proximal end) of each cam plate 247 is superimposed on the side surface of the forward end portion of the guide rail 231a and is vertically rotatably attached thereto via an axle 247d. The cam plate 247 is normally kept at an upper position (a position shown in FIG. 23), i.e., a retracted position in which it is substantially parallel to the rotation base 231, by means of a spring used as an urging means for retracting, i.e., a torsion spring 247*b* (see FIG. 25), so as not to contact the slide base 223 or the guide rail 222. Further, the torsion spring 247*b* is arranged around the axle 247*d*. One end thereof is engaged with the rotation base 231. The other end thereof is engaged with the cam plate 247. As a result, the torsion spring 247*b* constantly urges the cam plate 247 toward a retracted position.

As shown in FIG. 24, when the widthwise slide base 241 moves from the retreated position to the advanced position so that each guide roller 246 is transferred from the guide rail 231*a* onto the cam surface 247*a* of the cam plate 247, the cam plate 247 is downwardly rotated due to the load of the side of the seat main body 210. Such a rotation is limited when the cam plate 247 contacts a cam stopper 247*c* fixed to the rotation base 231. A lower position in which such a rotation is limited by the cam stopper 247*c* corresponds to an ascent/descent guide position in the present invention. Also, the cam plate 247 corresponds to the ascent/descent guide member in the present invention.

The cam surface 247*a* of each cam plate 247 is formed in an inclined configuration so as to guide such that the guide roller 246 moves obliquely downwards along a predetermined path at the ascent/descent guide position when the widthwise slide base 241 moves toward the door opening K (moves from the retreated position to the advanced position). Further, in this embodiment, the cam surface 247*a* is defined by a continuously extending gently curved surface. Thus, when the guide rollers 246 roll on the cam surfaces 247*a* of the cam plates 247, the four-bar linkage mechanisms 244 vertically rotate (incline) around the axles 244*c* and 244*b* in correspondence with the inclination of the cam surfaces 247*a*, so that the auxiliary base 245 supported by the four-bar linkage mechanisms 244, and by extension the seat main body 210, ascend or descend between a raised position and a lowered position.

The four-bar linkage mechanisms 244, the guide rollers 246 and the cam plates 247 described above form a raising/lowering mechanism 248 for the seat main body 210, and the raising/lowering mechanism 248 thus constructed and the above-mentioned widthwise slide mechanism 243 form a raising/lowering device 240. Further, when the seat main body 210 is moved from a lowered position to a raised position, the cam plates 247 are returned to the retracted position by the torsion springs 247*b*.

Figure 26:
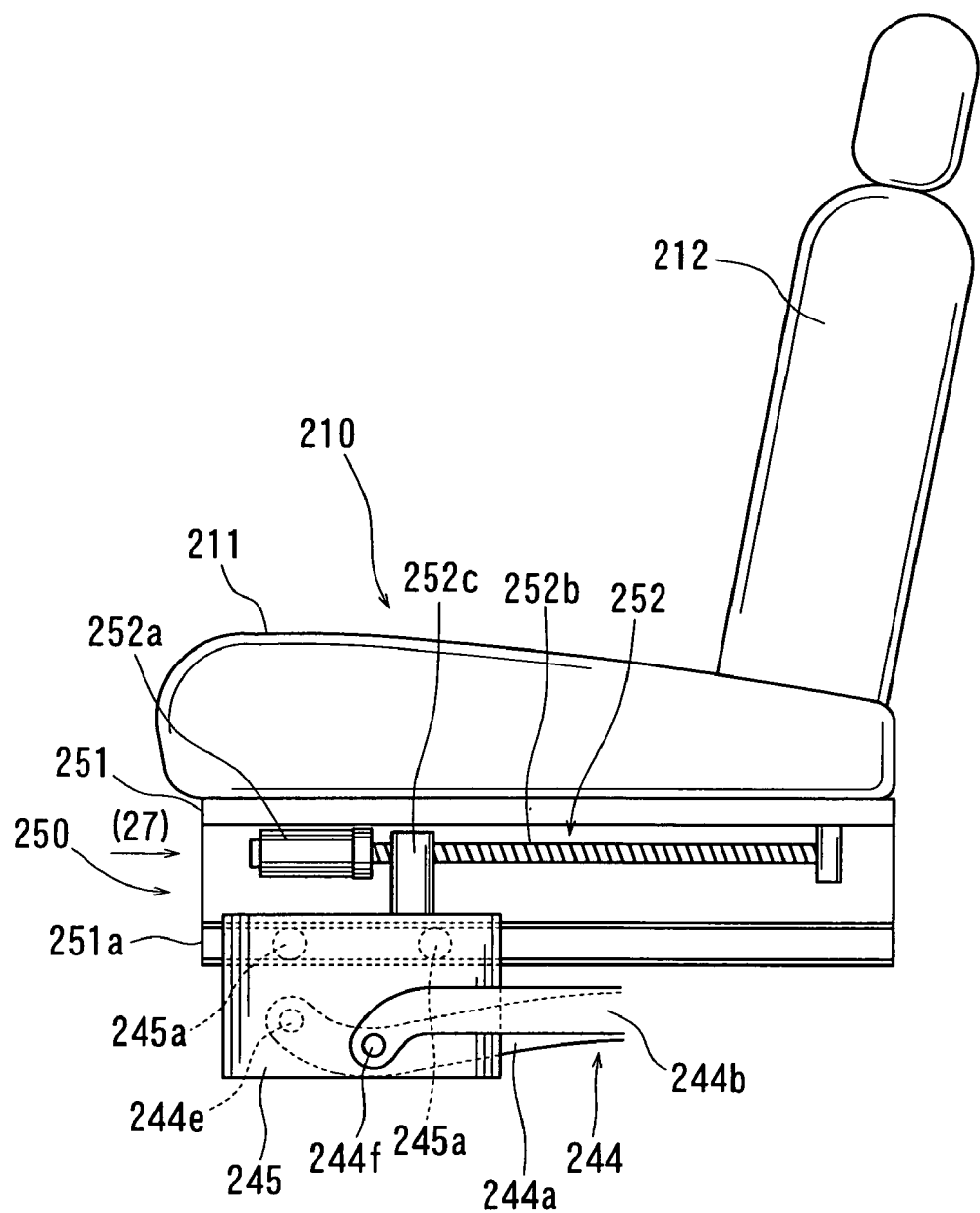
FIG. 26 is a diagram schematically illustrating the slide structure of a seat support base, which is viewed from a lateral side.
Figure 27:
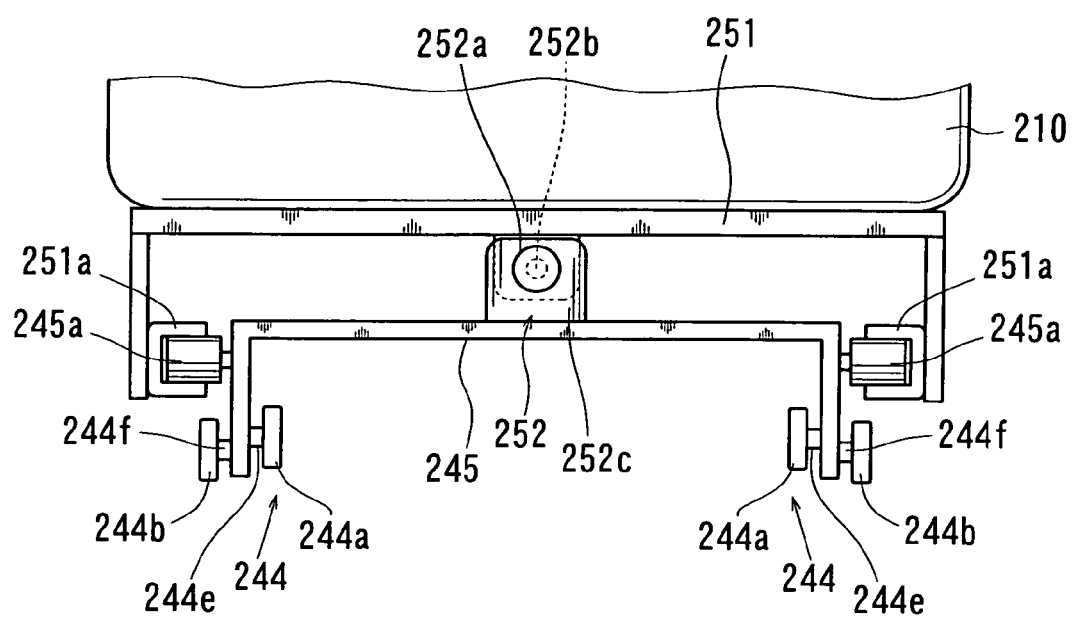
FIG. 27 is a diagram showing the slide structure of the seat support base, which is viewed along an arrow (27) of FIG. 26.
Figure 28:
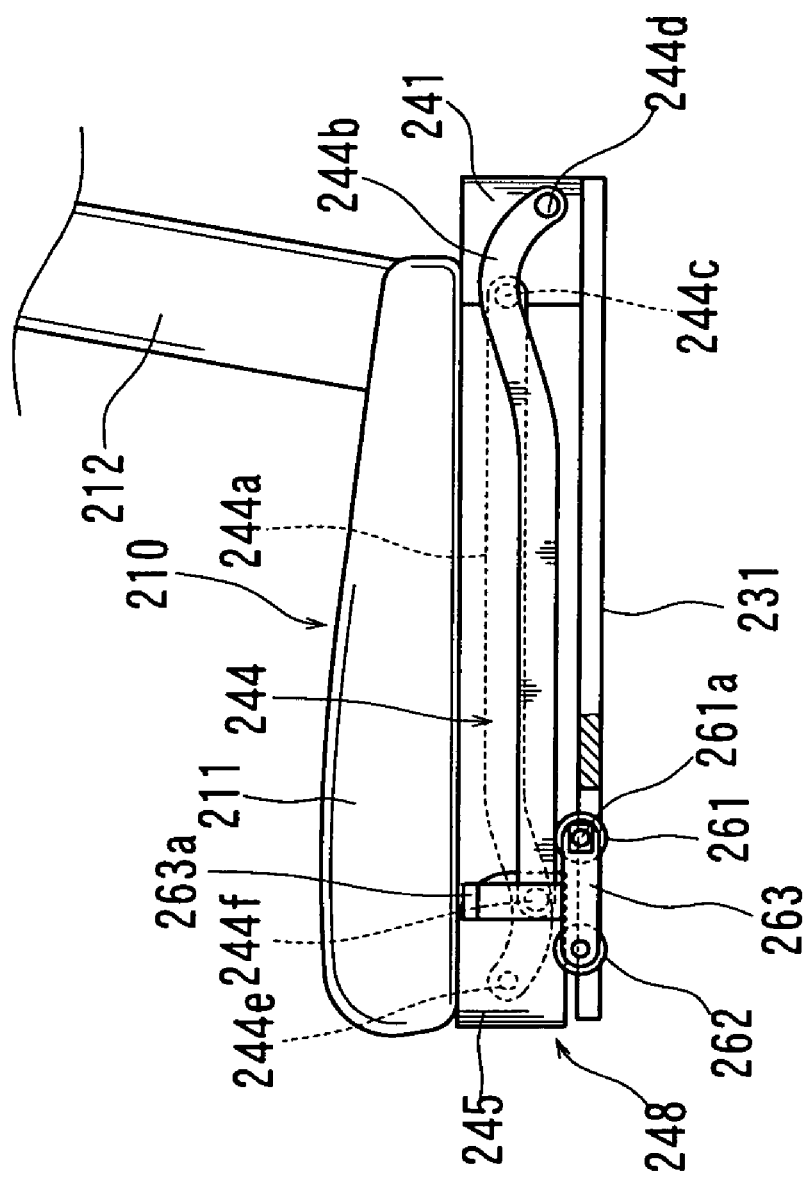
FIG. 28 is a diagram illustrating a raising/lowering mechanism of a vehicle seat moving apparatus according to a fifth embodiment of the present invention.

A seat support base 251 supporting the seat main body 210 is slidably provided to the upper surface side of the auxiliary base 245. In a condition in which the seat main body 210 faces the door opening K, the seat support base 251 slides in the vehicle width direction (the same direction as the widthwise slide base 241). FIG. 26 is a diagram schematically illustrating the slide structure of the seat support base 251, which is viewed from a lateral side. FIG. 27 is a diagram viewed from a front side (a direction of an arrow (27) in FIG. 26). As shown in the drawings, the lower surface of the seat support base 251 is provided with two slide rails 251*a* that are parallel to each other. The slide rails 251*a* are slidably supported by a plurality of guide rollers 245*a* that are rotatably attached to the auxiliary base 245. Provided between the auxiliary base 245 and the seat support base 251 is an auxiliary slide driving device 252 that has an electric motor 252*a* as an auxiliary slide drive source, a screw shaft 252*b*, and a nut 252*c*. By starting the electric motor (auxiliary slide motor) 252*a* of the auxiliary slide driving device 252 under a condition where the seat main body 210 faces the door opening K so that the screw shaft 252*b* meshing with the nut 252*c* is rotated, the seat main body 210 can be moved in the vehicle width direction with respect to the auxiliary base 245. The guide rollers 245*a*, the seat support base 251, the slide rails 251*a* and the auxiliary slide driving device 252 described above constitute an auxiliary slide mechanism 250 for the seat main body 210.

In this way, the seat main body 210 is moved in two stages in the vehicle width direction by the widthwise slide mechanism 243 and the auxiliary slide mechanism 250.

In this case, the movement of the seat main body 210 by the auxiliary slide mechanism 250 is a horizontal movement in the vehicle width direction, whereas as stated above, the movement of the seat main body 210 by the widthwise slide mechanism 243 involves displacements in the vehicle width direction and the vertical direction. That is, when the widthwise slide base 241 is moved from a retreated position to an advanced position, the four-bar linkage mechanisms 244 rotate downwardly while moving to the exterior of the vehicle cabin, and the auxiliary base 245, and by extension the seat main body 210, moves (descends) from a raised position to a lowered position along an arcuate path. Conversely, when the widthwise slide base 241 is moved from the advanced position to the retreated position, the four-bar linkage mechanisms 244 rotate upwardly while moving to the interior of the vehicle cabin, and the seat main body 210 is returned to a raised position from a lowered position along an arcuate path.

The vehicle seat moving apparatus 201 thus constructed moves from the interior to the exterior of the vehicle cabin, as described below, so that the seated person can exit from the vehicle cabin.

First, in a seating position in which the seated person faces the front side of the vehicle, the electric motor 224*a* for longitudinal sliding is normally actuated and the seat main body 210 slides forwards relative to the vehicle. Further, the electric motor 232 for rotation is actuated and the seat main body 210 rotates by approximately 90 degrees toward the door opening K while sliding forwards relative to the vehicle. Further, in this embodiment, the electric motors 224*a* and 232 are controlled such that the electric motor 224*a* for longitudinal sliding is actuated after the seat main body 210 is rotated by approximately 43 degrees from the seating position toward the door opening K, so that the rotating operation and the longitudinal sliding operation can be simultaneously performed. Due to the above rotating operation, the sliding direction of the widthwise slide mechanism 243 and the auxiliary slide mechanism 250 corresponds to the vehicle width direction.

In a condition in which the seat main body 210 faces the door opening K, the electric motor 252*a* for auxiliary sliding is actuated so that the seat main body 210 is horizontally moved to the exterior of the vehicle cabin via the door opening K. This condition is shown in FIG. 19. The seat main body 210 moved by the auxiliary slide mechanism 250 passes through the door opening K under this condition.

Thereafter, the electric motor 242*a* of the widthwise slide mechanism 243 is actuated so that the widthwise slide base 241 moves from the retreated position toward the advanced position. As a result, the seat main body 210 moves further to the exterior of the vehicle cabin by the four-bar linkage mechanisms 244. At this time, the guide rollers 246, provided to the lower link arms 244*b* of the four-bar linkage mechanisms 244, roll on the upper surfaces of the guide rails 231*a*, and then are transferred onto the cam surfaces 247*a* of the cam plates 247. As a result, the cam plates 247 rotate downwardly against the torsion springs 247*b*, and then abut the cam stoppers 247c so as to restrained at the ascent/descent guide position. Thereafter, the guide rollers 246 roll on the cam surfaces 247a of the cam plates 247 in the ascent/descent guide position. Then, the four-bar linkage mechanisms 244 rotate downwardly in correspondence with the inclination of the cam surfaces 247a so that the seat main body 210 is moved from a raised position to a lowered position. This condition is shown in FIG. 20. The movement path of the seat main body 210 at this time is determined by the configuration of the cam surfaces 247a of the cam plates 247.

In this condition, the seat main body 210 is moved to the exterior of the vehicle cabin over a sufficient distance and is lowered to a level close to the ground surface. Therefore, the seated person can be easily transferred to a wheelchair that is placed alongside of the seat main body 210.

After the seated person has left the seat main body 210 upon completion of the transferring, the seat main body 210 is returned to the interior of the vehicle cabin by an operation reverse to the above described operation. Further, when the person gets into the car, after the person transfers to and sits upon the seat main body 210 that is moved to the exterior of the vehicle cabin, the seat main body 210 is returned to a seating position in the interior of the vehicle cabin by an operation reverse to the above described operation. During this period, the seated person may remain seated on the seat main body 210. This may remarkably reduce the labor of the seated person and any helpers for the seated person.

According to the vehicle seat moving apparatus 201 of this embodiment, when the seat main body 210 is moved between a raised position and a lowered position, the cam plates 247, that defines the moving path of the seat main body 210, rotate from the retracted position to a ascent/descent guide position that is positioned below the retracted position, so as to guide and vertically rotate the four-bar linkage mechanisms 244. Therefore, the cam plates 247 can be displaced greatly so as to be lower than the rotation base 231. As a result, it is possible to easily set the requisite lift amount of the seat main body 210. Further, the distance L from the rotation center Q of the lower link arms 244b to the fulcrum P at the time that the seat main body 210 reaches the lowered position can be increased without having to form large curved portions in the lower link arms 244b. Therefore, it is possible to reduce the vertical height of the lower link arms 244b as compared with a prior art structure. As a result, even if the four-bar linkage mechanisms 244 are arranged on the lower surface of the seat main body 210, it is possible to keep the hip point HP of the seat main body 210 at a low level.

Incidentally, as shown in FIG. 17, the conventional raising/lowering device is constructed such that the lower link arms 104b of the four-bar link mechanisms rotate while sliding on ascent/descent guide pins 106. Therefore, the distance L between the rotation center Q and the fulcrum P of the lower link arms 104b varies with the movement of the slide base 103. As a result, the load applied to the electric motor for moving the slide base 103 fluctuates greatly.

In contrast, as shown in FIGS. 23 and 24, in the raising/lowering device 240 of the vehicle seat moving apparatus 201 of this embodiment the guide rollers 246 are attached to the upper link arms 244a of the four-bar link mechanisms 244, and the guide rollers 246 roll on the cam surfaces 247a of the cam plates 247. Therefore, during the movement of the widthwise slide base 241, the distance L from the rotation center Q of the upper link arms 244a to the fulcrum P (an abutment point of the cam surfaces 247a and the guide rollers 246) is maintained as a constant. Thus, if the load applied to the electric motor 242a fluctuates when the guide rollers 246 roll on the cam surfaces 247a of the cam plates 247, the range of fluctuation is smaller than the range in the prior art. Further, such load fluctuation occurs gently. As a result, the burden on the electric motor 242a is reduced. This may lead to improved durability of the electric motor 242a. Also, the movement path of the seat main body 210 between a raised position and a lowered position is determined by the configuration of the cam surfaces 247a of the cam plates 247. Therefore, it is possible to set a smooth movement path.

Further, in the fourth embodiment, when the widthwise slide base 241 is moved from the advanced position to the retreated position, the guide rollers 246 are transferred from the cam plates 247 onto the guide rails 231a, having horizontal upper surfaces. Therefore, in a condition in which the widthwise slide base 241 is moved to the retreated position, no load acts on the widthwise slide base 241 in the moving direction. As a result, it is possible to maintain the seat main body 210 at the raised position without applying any load to the electric motor 242a for widthwise sliding.

Further, the seat main body 210 descends after it is moved to the exterior of the vehicle cabin by the auxiliary slide mechanism 250. Therefore, the moving distance to the exterior of the vehicle cabin can be increased. As a result, the seat main body 210 can be lowered to a level closer to the ground surface. This may also lead to easy transferring of the seated person between the seat main body 210 and, for example, a wheelchair.

Next, a fifth embodiment of the present invention will be described with reference to FIGS. 28-31, which embodiment is further modified from the fourth embodiment. The fifth embodiment is a modified form with respect to the raising/lowering mechanism 248 for raising and lowering the seat main body 210. Further, other constructions are the same as the fourth embodiment described above. In this embodiment, each of the ascent/descent guide members is formed by a first roller 261 and a second roller 262. The first roller 261 is attached to the rotation base 231 so as to be rotatable at a fixed position. The second roller 262 is disposed in a position spaced apart from the first roller 261 at a predetermined distance and is shiftable between a retracted position (a position shown by the solid line in FIG. 29) and an ascent/descent guide position (a position shown by the chain double-dashed line in FIG. 29) via an arm 263 that is vertically rotatably attached to the rotation base 231.

Figure 30:
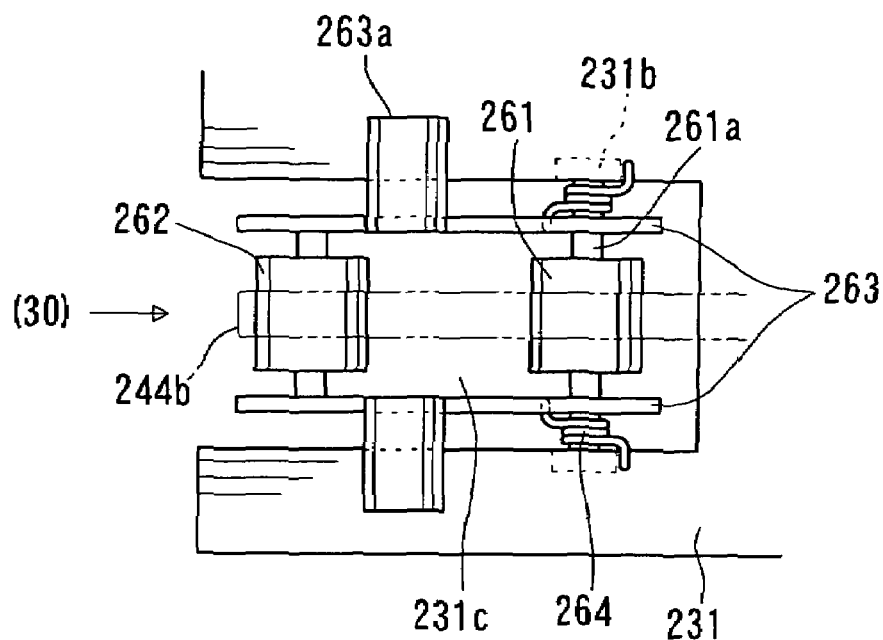
FIG. 30 is a plan view of the raising/lowering mechanism.
Figure 31:
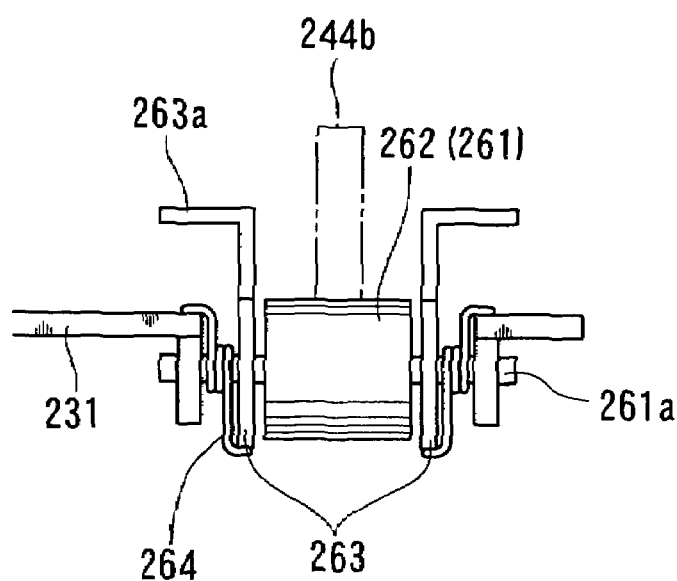
FIG. 31 is a view viewed along an arrow (30) of FIG. 30.

As shown in FIGS. 30 and 31, the first roller 261 and the second roller 262 are disposed between two opposing arms (plates) 263, arranged in parallel, and attached to the end portions thereof, and are arranged in a cutout 231c formed in the rotation base 231. The roller shaft 261a of the first roller 261 is rotatably supported by a support portion 231b formed in the rotation base 231. Thus, the arms 263 are vertically rotatable by utilizing the rotation center of the first roller 261 as the fulcrum so that the second roller 262 is displaced between the retracted position and the ascent/descent guide position.

Torsion springs 264 are disposed around the roller shaft 261a. One end of each of the torsion springs 264 is engaged with the arms 263, and the other end thereof is engaged with the side of the rotation base 231. Thus, the second roller 262 is normally retained in a retracted position. Further, stoppers 263a are formed near the end of the arms 263 close to the second roller 262. The stoppers 263a may abut the upper surface of the rotation base 231 when the arms 263 downwardly rotate, thereby restricting further downward rotation of the arms 263.

The lower link arm 244b of each four-bar linkage mechanism 244 is positioned on the first roller 261 when the widthwise slide base 241 is in a retreated position. Therefore, when the widthwise slide base 241 moves toward the advanced position, it moves while being supported by the first roller 261. As shown in the drawings, the configuration of the proximal portion side (rotation center side portion) of the lower link arm 244b (the configuration of a surface that contact the rollers 261 and 262) is gently curved such that during the course of movement, the lower link arm 244b can be gradually rotated downwards as the rotation center of the lower link arm 244b approaches the first roller 261.

In the fifth embodiment, constructed as described above, when the widthwise slide base 241 is moved from a retreated position to the advanced position, the lower link arm 244b of each four-bar linkage mechanism 244 moves on the first roller 261. At this time, the second roller 262 is situated on the front side of the first roller 261, with respect to the moving direction of the lower link arm 244b (i.e., the front side of the seat). Therefore, the lower link arm 244b moves over the second roller 262 while being supported by the first roller 261. The lower link arm 244b rotates gradually downwards along the curved configuration thereof when the curved portion of the lower link arm 244b approaches a position on the first roller 261. With the rotation of the lower link arm 244b, the second roller 262 is pushed downwardly by the lower link arm 244b. As a result, the arms 263 are rotated downwards, together with the second roller 262, against the torsion springs 264 and are stopped when the stoppers 263a contact the upper surface of the rotation base 231. That is, when the widthwise slide base 241 is in a retreated position, the second roller 262 is retained in a retracted position by the torsion springs 264, whereas when the widthwise slide base 241 moves from a retreated position to an advanced position, the second roller 262 is shifted to the ascent/descent guide position by receiving the load of the side of the seat main body 210 via the lower link arm 244b during the course of the movement.

After the second roller 262 is shifted to the ascent/descent guide position, the lower link arm 244b is transferred from the first roller 261 onto the second roller 262 (which is spaced apart from the first roller 261). As a result, the lower link arm 244b is switched from a condition in which it is support by the first roller 261 to a condition in which it is support by the second roller 262. Thereafter, the lower link arm 244b is further rotated downwardly while being supported by the second roller 262. Thus, the seat main body 210 is shifted from a raised position (position A in FIG. 29) to a lowered position (position C in FIG. 29) by way of an intermediate position (position B in FIG. 29).

As in the fourth embodiment, in this condition the seat main body 210 is moved to the exterior of the vehicle cabin over a sufficient distance and is lowered to a level close to the ground surface. Therefore, the seated person can be easily transferred to a wheelchair that is positioned alongside of the seat main body 210.

Further, when the widthwise slide base 241 is moved from the advanced position to the retreated position, the seat main body 210 is restored from a lowered position to a raised position by an operation reverse to the above described operation.

In this way according to the fifth embodiment, when the seat main body 210 moves between a raised position and a lowered position, the lower link arm 244b can be supported by the first roller 261 at the raised position, and can be supported by the second roller 262 at the lowered position. As a result, as compared with the conventional structure shown in FIG. 17, i.e., the structure in which the lower link arm 104b is guided by a single ascent/descent guide pin 106 that is disposed in a fixed position, the fulcrum of the lower link arm 104b can be positioned away from the rotation center of the lower link arm 104b. Therefore, it is possible to reduce the load on the electric motor 242a for moving the widthwise slide base 241.

Figure 29:
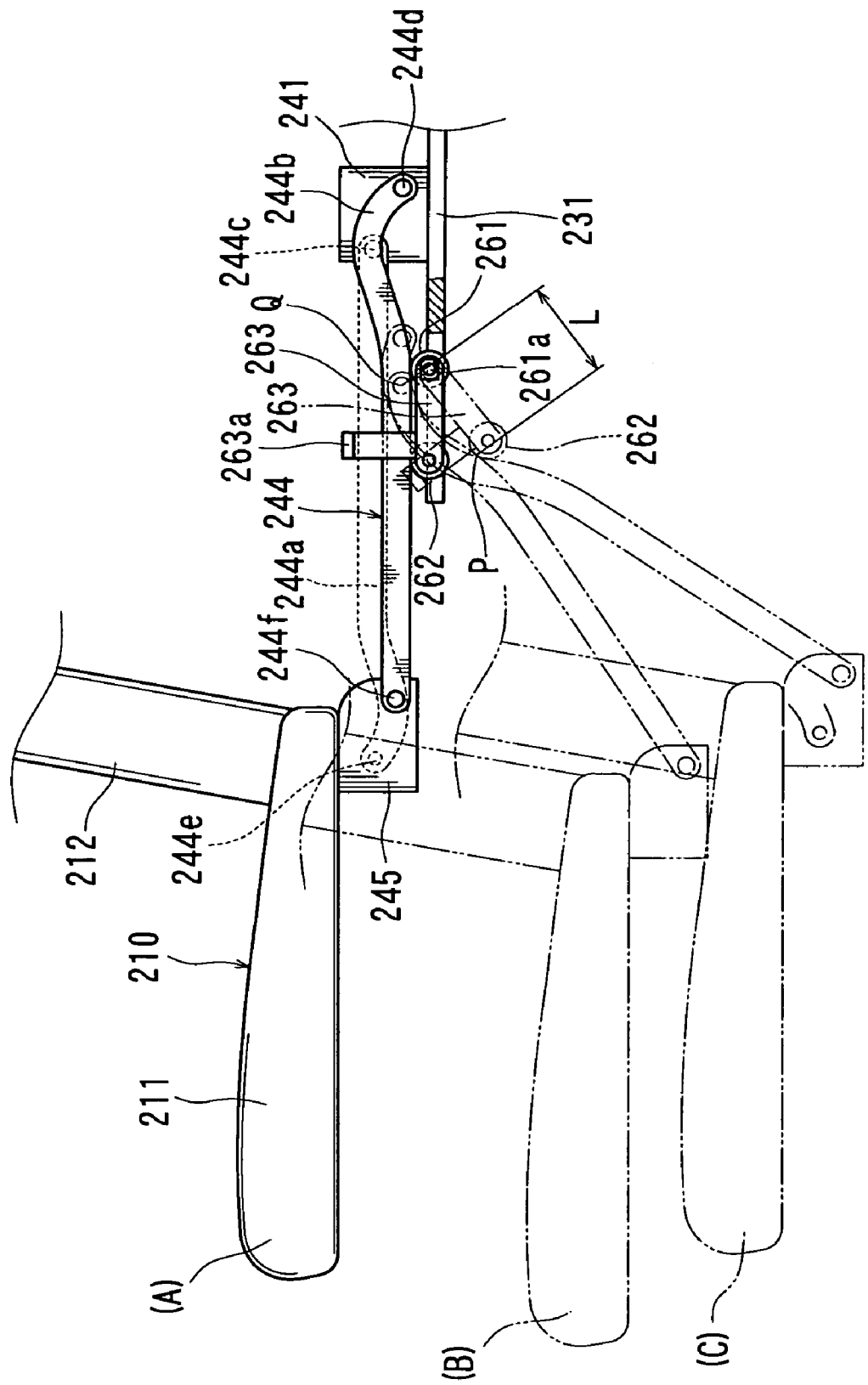
FIG. 29 is a diagram illustrating an operation mode of the raising/lowering mechanism of the vehicle seat moving apparatus of the fifth embodiment operates.

Further, the link mechanism 244 can be guided by the second roller 262 so as to vertically rotate at a position remote from the rotation center of the lower link arm 104b. Therefore, as in the fourth embodiment, it is possible to easily set the requisite lift amount of the seat main body 210. Further, as shown in FIG. 29, the distance L from the rotation center Q of the lower link arm 244b to the fulcrum P provided by the second roller 262 at the time that the seat main body 210 has reached a lowered position can be increased without having to form a large curved portion in the lower link arm 104b. Therefore, even if the four-bar linkage mechanisms 244 are arranged on the lower surface of the seat main body 210, it is possible to keep the hip point HP (a height of a seat surface) of the seat main body 210 at a relatively low level.

Further, in the fifth embodiment, when the lower link arm 244b is transferred between the first roller 261 and the second roller 262, i.e., when the fulcrum of the lower link arm 244b is switched, the load on the electric motor 242a can be abruptly changed. In this respect, in the fourth embodiment described above the guide roller 246 rotates on cam plates 247 so that the fulcrum of the lower link arm 244b moves successively, that is the distance from the rotation center to the fulcrum of the lower link arm 244b is maintained as a constant. Therefore, there is no such problem that the load on the electric motor 242a is abruptly changed. This is effective in protecting the electric motor 242a.

The fourth and fifth embodiments described above can be further modified. For example, although the vehicle seat moving apparatus 201 that is applied to a passenger seat is exemplified and described, its application is not limited to the passenger seat. Further, with regard to the construction in which the seat main body 210 is moved in the longitudinal direction by the longitudinal movement mechanism 220, and the construction in which it is moved horizontally in the vehicle width direction by the auxiliary slide mechanism 250, one or both of the mechanisms can be omitted. Further, in the first and second embodiments, the restoration of the cam plates 247 and the second rollers 262 to the retracted positions is performed when the seat main body 210 moves from a lowered position to a raised position. However, this should not be construed restrictively. For example, such restoration can be performed in an early stage of rotation at the time that the seat main body 210 rotates toward a position where it faces the front side of the vehicle after it has moved to the raised position.

Further, the seat raising/lowering arm in the present invention is not limited to the four-bar linkage mechanism 244. Also, although in the fourth embodiment the guide roller 246 is provided to the lower link arm 244b, the guide roller 246 can be provided to the upper link arm 244a. Further, although in the fifth embodiment the lower link arm 244b is guided by the first roller 261 and the second roller 262, the upper link arm 244a can be guided thereby.

The urging means for retaining the cam plate 247 at a retracted position in the fourth embodiment and the urging means for retaining the second roller 262 at a retracted position in the fifth embodiment are not limited to the torsion springs 247b and 264.

Figure 32:
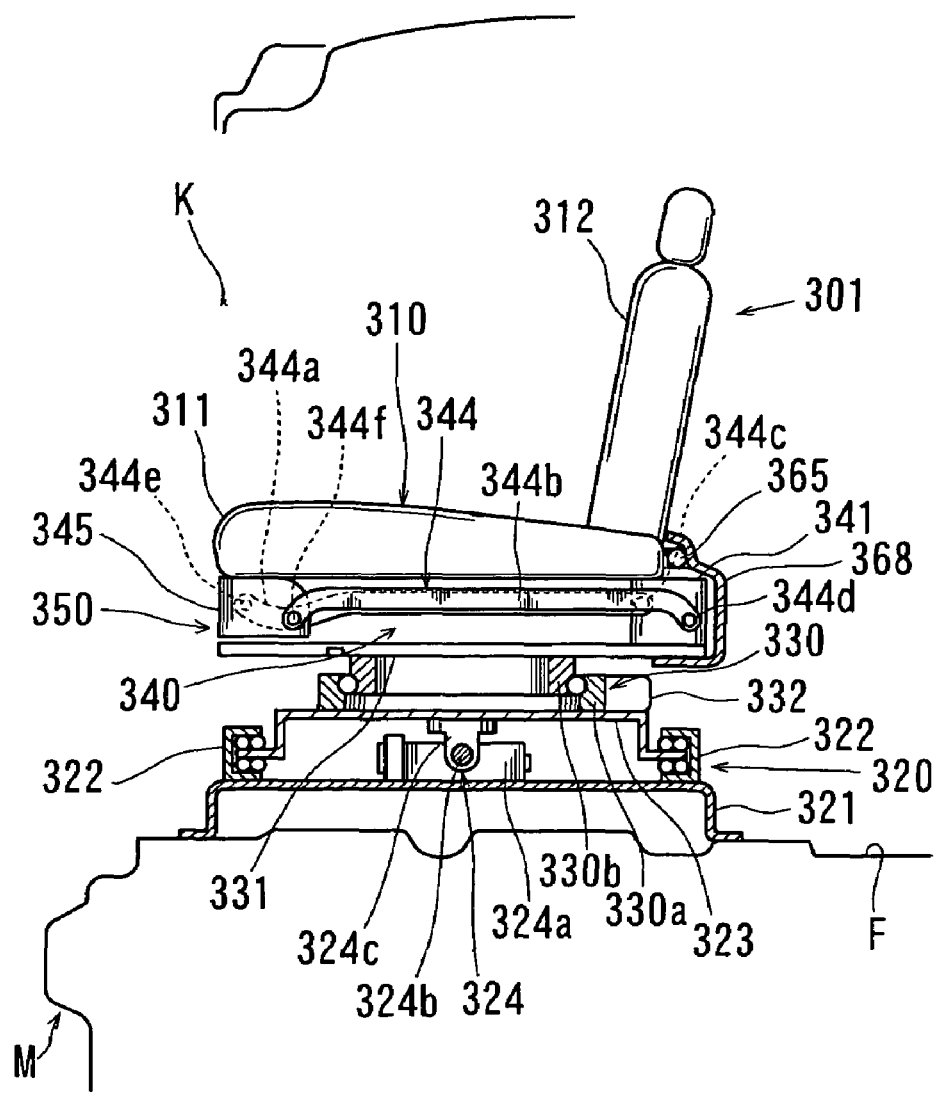
FIG. 32 is a rear view of a vehicle seat moving apparatus according to a sixth embodiment of the present invention, which is viewed from a rear side of a vehicle. This diagram shows a condition in which a seat main body faces a door opening.
Figure 33:
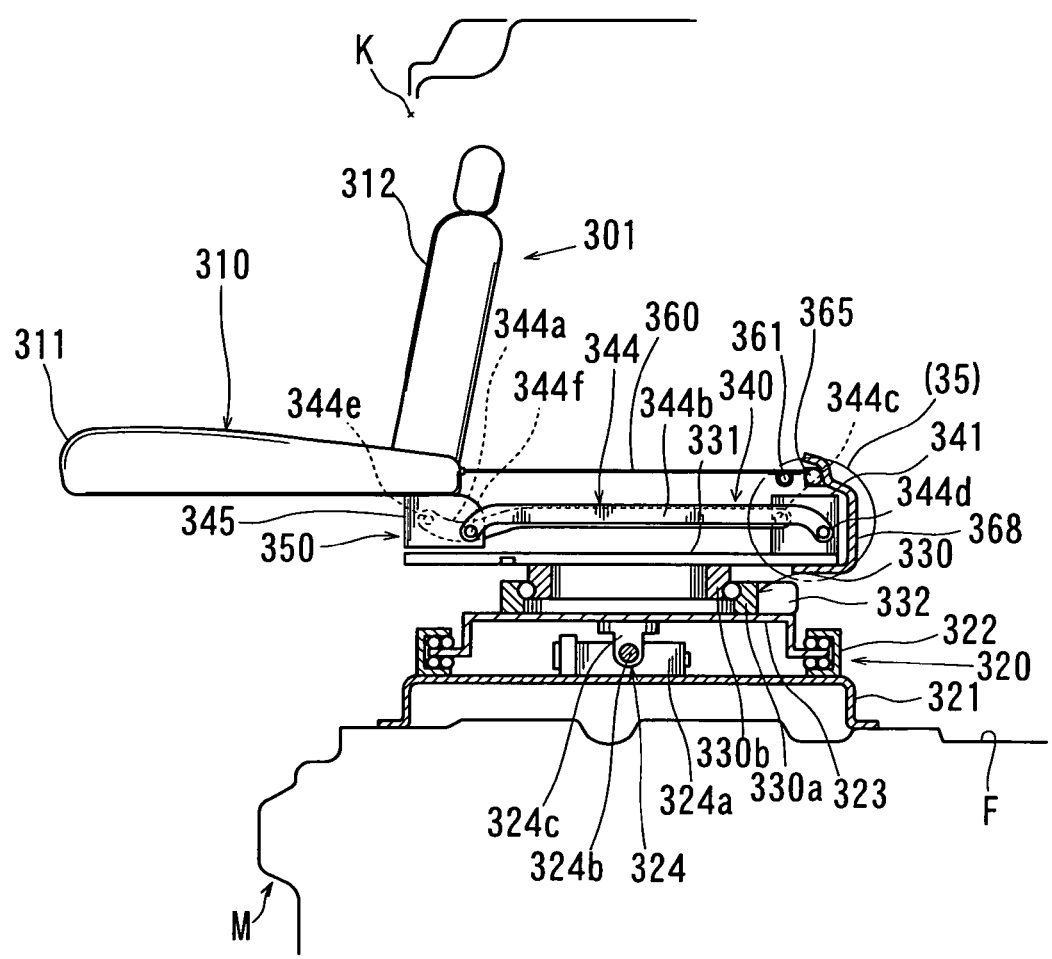
FIG. 33 is a rear view of the vehicle seat moving apparatus of the sixth embodiment, which is viewed from the rear side of the vehicle. This diagram shows a condition in which the seat main body is moved to the exterior of a vehicle cabin by a slide mechanism.
Figure 34:
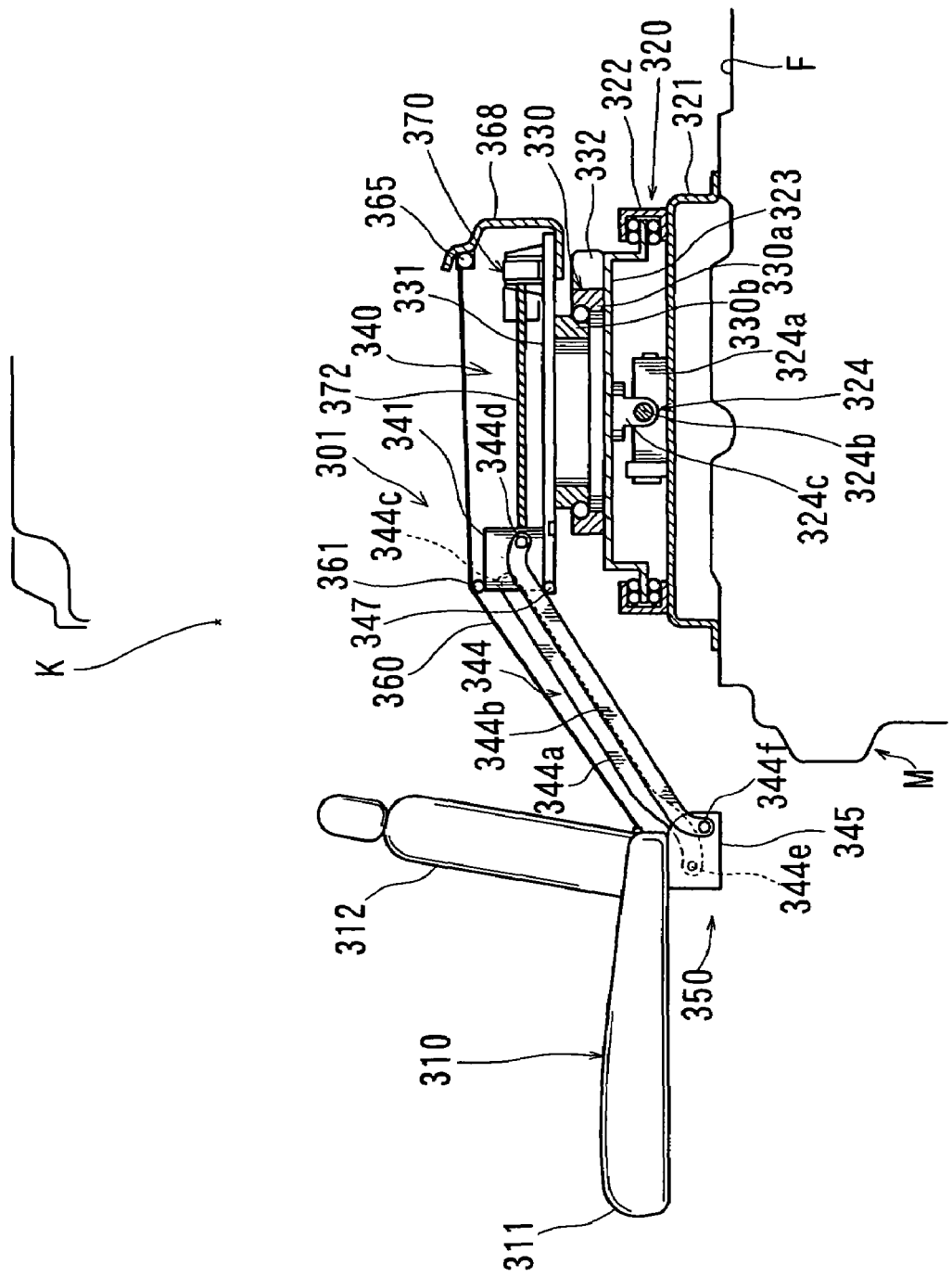
FIG. 34 is a rear view of the vehicle seat moving apparatus of the sixth embodiment, which is viewed from the rear side of the vehicle. This diagram shows a condition in which the seat main body is moved to the exterior of the vehicle cabin by a raising/lowering mechanism while it is lowered to a level close to the ground surface.
Figure 35:
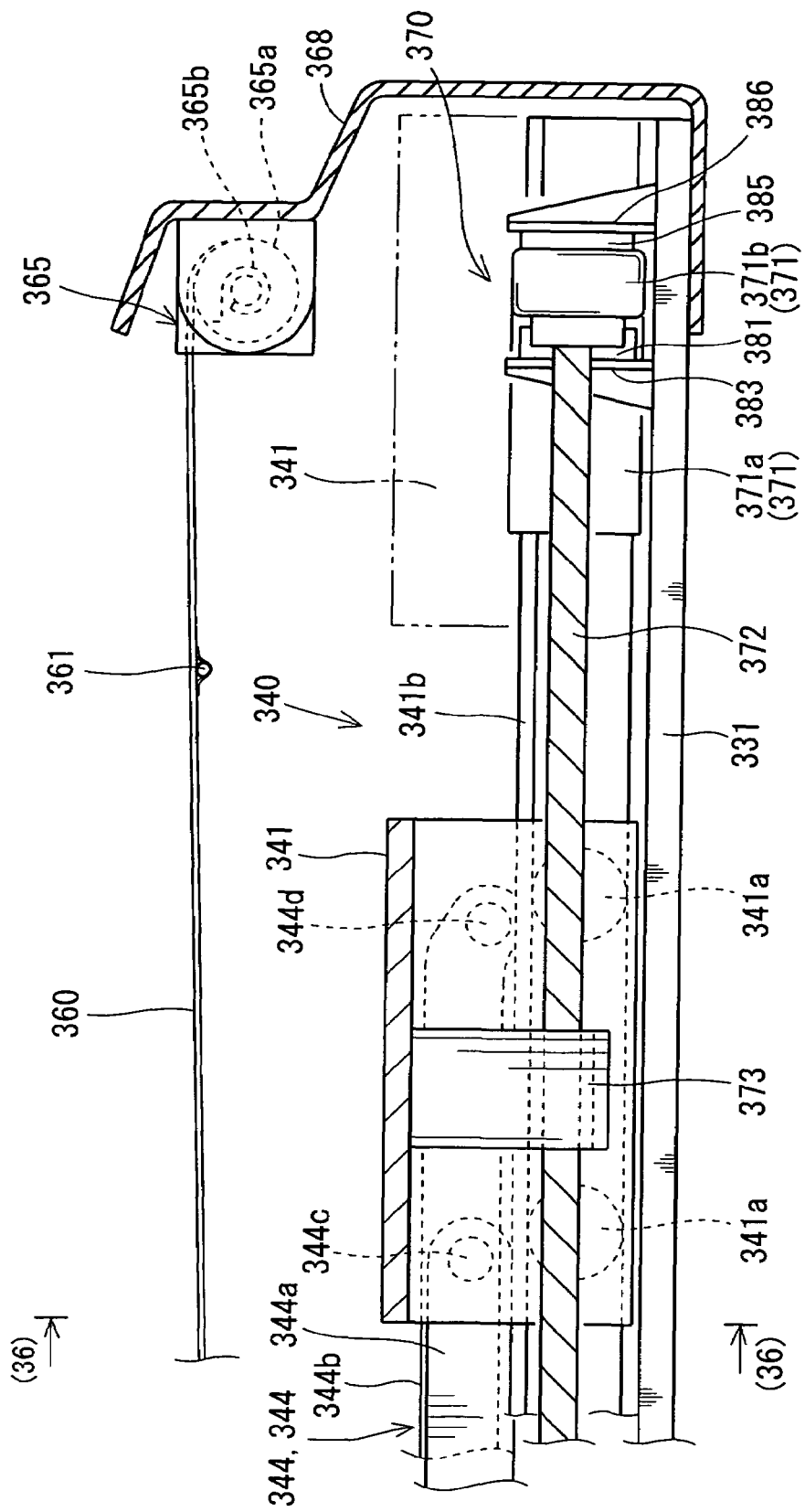
FIG. 35 is an enlarged view of the portion (35) of FIG. 33 and is a side view of a rear portion of the raising/lowering mechanism and a periphery of a winding device. In the drawing, a stationary cover is shown in longitudinal cross section.
Figure 36:
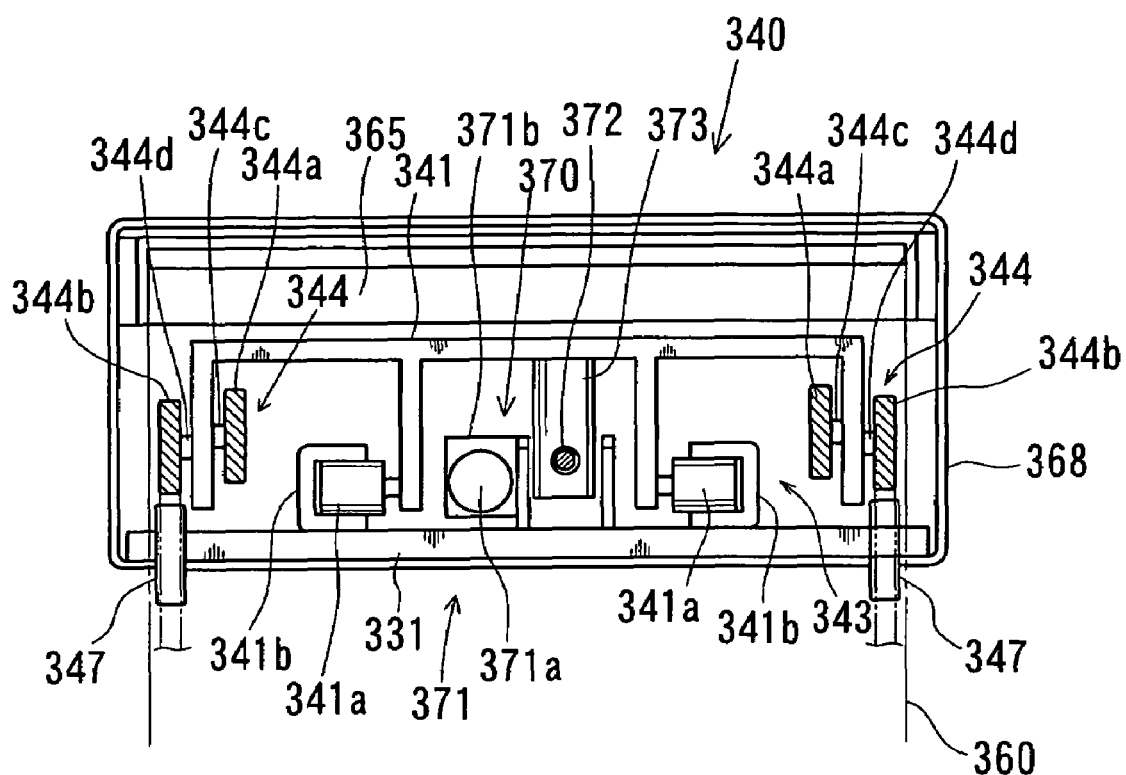
FIG. 36 is a longitudinal cross-sectional view of the raising/lowering mechanism, which is viewed along arrows (36)-(36) of FIG. 35.
Figure 37:
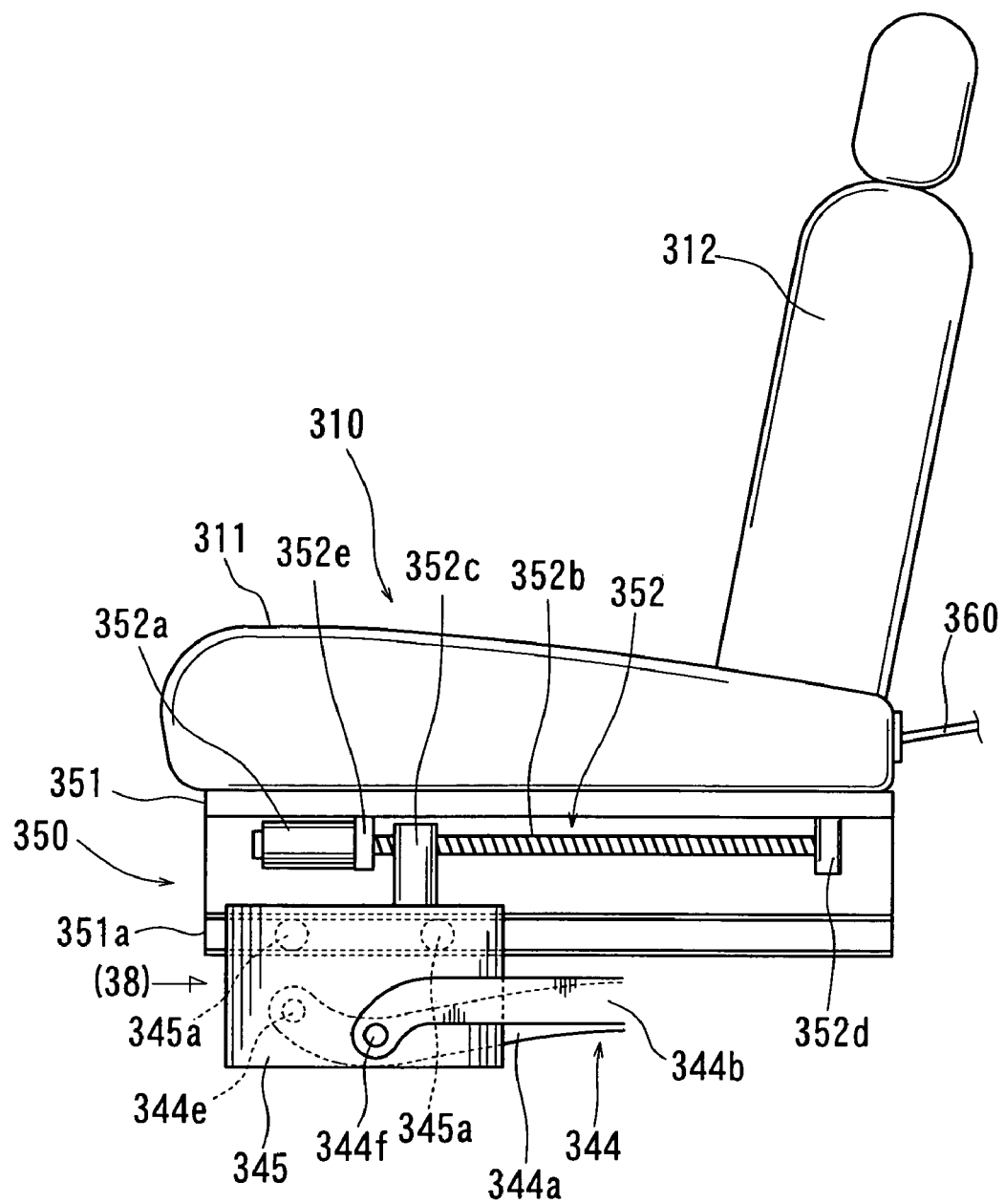
FIG. 37 is a side view of a slide mechanism.
Figure 38:
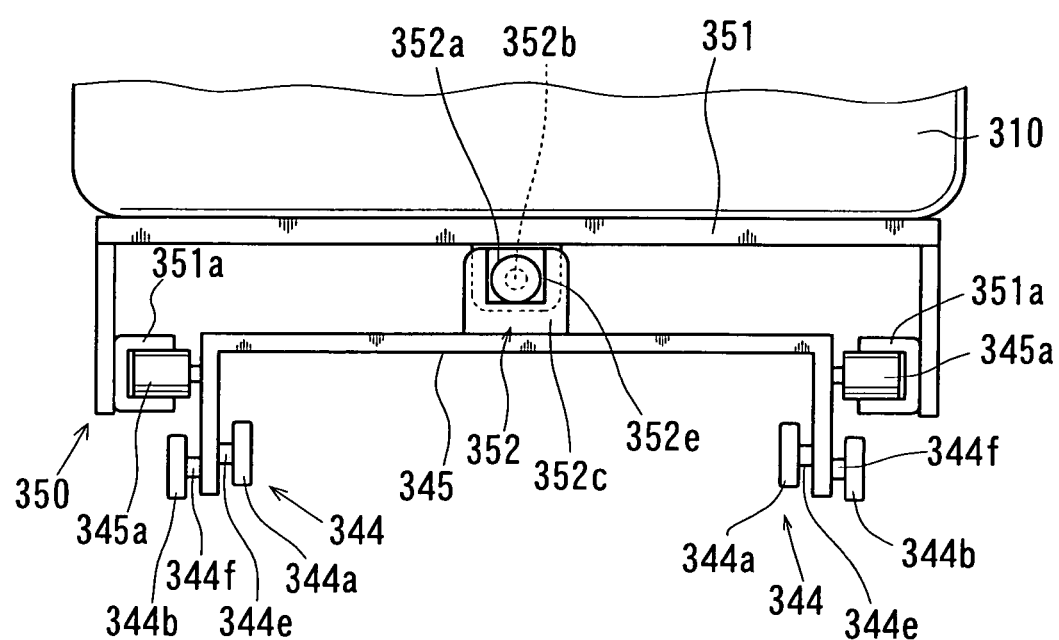
FIG. 38 is a diagram showing the slide mechanism, which is viewed along an arrow (38) of FIG. 37.

Next, the above-described embodiments can be further modified. For example, FIGS. 32-34 show a vehicle seat moving apparatus 301 of the sixth embodiment. Disposed between a seat main body 310 and a raising/lowering mechanism 340 of the vehicle seat moving apparatus 301 are a cover member 360 that covers a movement route of the seat main body 310 and a take-up device 365 for taking up the same. As shown in FIG. 35, the take-up device 365 is attached to the upper portion of the inner side of a box-shaped stationary cover 368 that is attached to the rear end portion of a rotation base 331. Further, the stationary cover 368 has a protruding/recessed configuration so as to receive respective rear portions of a movement base 341, which has reached a retreated position indicated by the chain double-dashed lines in FIG. 35, as well as a driving device 370. Because they are received in the stationary cover 368, they are prevented from being exposed to the vehicle cabin. As a result, the vehicle seat moving apparatus 301 may have an improved appearance in the vehicle cabin. Further, the stationary cover 368 may prevent the driving device 370 from contacting the clothes of the occupant or other such parts.

The cover member 360 is formed of a synthetic leather material (a leather skin) having enough flexibility to allow taking up and has substantially the same width as the rotation base 331. The forward end portion of the cover member 360 is fixed along the rear portion of the seat main body 310, i.e., along the rear surface of a seat cushion 311, so as to be stretched in the width direction thereof. The take-up device 365 contains a take-up roll 365a for taking up the cover member 360. The take-up roll 365a is urged by a torsion spring 365b so as to take up the cover member 360. Therefore, the cover member 360 is paid out against the urging force in the take-up direction of the take-up roll 365.

Further, on the back side (the lower surface side in FIG. 35) of substantially the center of the cover member 360 in the longitudinal direction (take-up and paying out direction), a single reinforcing bar 361 is disposed so as to extend between the widthwise end portions thereof. The reinforcing bar 361 has the same length as the width of the cover member 360. The reinforcing bar 361 corresponds to one embodiment of a stretching means described in the claims.

As shown in FIG. 32, in a condition in which the movement base 341 is restored to the retreated position in the interior of the vehicle cabin, so that the seat main body 310 is situated in the interior of the vehicle cabin, the cover member 360 is completely taken up by the take-up device 365 together with the reinforcing bar 361.

As stated above, the forward end of the cover member 360 is fixed to the rear portion of the seat main body 310. Therefore, when the seat main body 310 is moved to the exterior of the vehicle cabin by the second slide mechanism 350, the cover member 360 is paid out against the take-up force (an urging force of the torsion spring 365b) of the take-up roll 360, depending on the motion of the seat main body 310. That is, the seat main body 310 moves to the exterior of the vehicle cabin while pulling and paying out the cover member 360. As a result, the cover member 360 is paid out while covering the movement route of the seat main body 310. A raising/lowering mechanism 340 is disposed in the movement route of the seat main body 310. Thus, due to the fact that the cover member 360 is paid out with the movement of the seat main body 310, a driving device 370, guide rails 351b, 341b, a screw shaft 372, a movement base 341, and both four-bar linkage mechanisms 344, 344 or other such members which constitute the raising/lowering mechanism 340, are covered by the cover member 360. This condition is shown in FIG. 33. As shown in the drawing, in this condition, the reinforcing bar 361 is slightly paid out from the take-up device 365 and is situated above the movement base 341.

As shown in FIG. 33, after the seat main body 310 is moved to the front end side of the sliding range in which it can be slid by the second slide mechanism 350, the movement base 341 of the raising/lowering mechanism 340 begins to advance toward the exterior of the vehicle cabin. As a result, the seat main body 310 is further moved to the exterior of the vehicle cabin so that the cover member 360 is further paid out.

When the movement base 341 is advanced, both of the four-bar linkage mechanisms 344, 344 move to the exterior of the vehicle cabin integrally with the movement base 341. When both of the four-bar linkage mechanisms 344, 344 move to the exterior of the vehicle cabin, axles 344c and 344d, of inner and outer link arms 344a and 344b thereof, approach an arm receiving member 347. Therefore, both of the four-bar linkage mechanisms 344, 344 are tilted downwards as shown in FIG. 4 so that the seat main body 310 moves to the exterior of the vehicle cabin while being displaced downwardly. When the seat main body 310 begins to move downwardly, the cover member 360 is bent in a chevron-shape in a manner that the reinforcing bar 361 contacts the upper surface of the movement base 341. In this condition, the cover member 360 is further paid out on the rear side of the reinforcing bar 361. At a stage where the cover member 360 is paid out as the movement base 341 is moved toward the exterior of the vehicle cabin, the positional relationship of the four-bar linkage mechanisms 344, 344 with respect to a range of the cover member 360, that is positioned between the seat main body 310 and the reinforcing bar 361 (a range positioned in the front side of the reinforcing bar 361), is not changed. Therefore, the four-bar linkage mechanisms 344, 344 are maintained in a condition in which they are covered with such a range of the cover member 360.

As shown in FIG. 34, when the movement base 341 is moved to the front end position of its movement range by the raising/lowering mechanism 340 so that the seat main body 310 is moved to a getting on/out position that is located at an outermost position of the exterior of the vehicle cabin, the cover 360 is in a condition in which it is maximally paid out from the take-up device 365. When the cover member 360 is thus maximally paid out, the reinforcing bar 361 is transferred onto the upper surface of the movement base 341. The position of the reinforcing bar 361 in the taking-up/paying-out direction (a lateral direction in FIG. 4) with respect to the cover member 360 is set such that the reinforcing bar 361 is transferred onto the upper surface of the movement base 341 when the seat main body 310 is moved to the getting on/out position outside of the vehicle cabin so that the cover member 360 is maximally paid out.

Thus, when the seat main body 310 is moved to the getting on/out position, the movement route of the seat main body 310 (a range between the rear portion of the seat main body 310 and the stationary cover 368) is entirely covered with the cover member 360. Therefore, as shown in FIG. 34, all of the components situated in the movement route of the seat main body 310, such as the driving device 370, the movement base 341, and the four-bar linkage mechanisms 344, 344, are covered with the cover member 360. As a result, the vehicle seat moving apparatus 301 may have an increased appearance in the condition where the seat main body 310 is moved to a getting on/out position. Also, these components can be prevented from contacting the clothes or other such parts of the occupant.

When the seat main body 310, previously situated in a getting on/out position, is returned to the interior of the vehicle cabin, the cover member 360 is automatically taken up by the take-up force of the take-up device 365 as the seat main body 310 moves to the interior of the vehicle cabin. When the seat main body 310 reaches to the rear end position of the movement range by the raising/lowering mechanism 340 and is further restored to the rear end position of the movement range by the second slide mechanism 350 so as to be located in the position shown in FIG. 32, the cover member 360 is completely taken up by the take-up device 365.

The vehicle seat moving apparatus 301 constructed as described above operates as follows. As a result, the seat main body 310 is moved from the interior to the exterior of the vehicle cabin so that the seated person can exit from the vehicle cabin. Conversely, the seat main body 310 is restored from the exterior to the interior of the vehicle cabin so that the seated person can be transferred to a seating position in the vehicle cabin (a left-hand side on a second seat row).

First, in the seating position where the seated person faces the front side of the vehicle, the driving motor 324*a* of the first slide mechanism 320 is actuated in the normal rotational direction and the seat main body 310 slides forwards. Further, as a result the rotation motor 332 of the rotation mechanism 330 is actuated in the normal rotational direction so that the seat main body 310 rotates by approximately 90 degrees toward the door opening K while sliding forward relative to the vehicle. When the seat main body 310 rotates by approximately 90 degrees so as to face the door opening K, the sliding direction of the raising/lowering mechanism 340 and the second sliding mechanism 350 is shifted to a direction along the vehicle width direction. FIG. 32 illustrates this stage.

Next, in a condition in which the seat main body 310 faces the door opening K, the driving motor 352*a* of the second slide mechanism 350 is actuated in the normal direction so that the seat main body 310 is moved horizontally toward the exterior of the vehicle cabin via the door opening K. FIG. 33 shows a condition in which the seat main body 310 has slid to the front end of the sliding range by the second sliding mechanism 350. When the seat main body 310 is thus moved to the exterior of the vehicle cabin, the cover member 360 is paid out from the take-up device 365. As a result, the components of the raising/lowering mechanism 340, which are situated in the movement route for the seat main body 310 (between the rear portion of the seat main body 310 and the take-up device 365) and are positioned above the rotation base 331, are covered with the cover member 360.

Next, the driving motor 371 of the raising/lowering mechanism 340 is actuated so that the movement base 341 moves from the retreated position shown in FIG. 33 toward the door opening K. This causes the seat main body 310 to move to the exterior of the vehicle cabin together with the four-bar linkage mechanisms 344, 344. Also, when the four-bar linkage mechanisms 344, 344 move to the exterior of the vehicle cabin as stated above, the inner link arms 344*a*, 344*a*, and the outer link arms 344*b*, 344*b*, respectively rotate downwards around the axles 344*c* and 344*d*. As a result, the seat main body 310 is lowered to a level closer to the ground surface while moving to the exterior of the vehicle cabin.

When the seat main body 310 thus moves to the exterior of the vehicle cabin while being lowered, the cover member 360 is further paid out. As a result, the movement route for the seat main body 310 (the rear side of the seat main body 310) is covered with the cover member 360.

As shown in FIG. 34, when the movement base 341 moves to the front end of the movement range by the raising/lowering mechanism 340, the seat main body 310 moves by a sufficient distance to the exterior of the vehicle cabin and is lowered to a level close to the ground surface. Therefore, the seated person can be easily transferred to a wheelchair that is placed alongside of the seat main body 310. After the transfer to the wheel chair is completed so that the seated person is removed from the seat main body 310, the seat main body 310 is restored to the interior of the vehicle by an operation reverse to the above described operation.

Further, in this condition, the movement route for the seat main body 310, where the components such as the driving device 370 for the raising/lowering mechanism 340, the movement base 341, and the four-bar linkage mechanisms 344, 344, that are situated in the movement route for the seat main body 310, are covered with the cover member 360. Therefore, the seat apparatus 301 has an increased appearance. Further, these components can be prevent from contacting the clothes or other such parts of any helpers or occupants.

Further, as shown in the drawings, in this stage, the reinforcing bar 361 is transferred onto the upper surface of the movement base 341. Therefore, the cover member 360 is bent in a chevron-shape along the rotation base 331 and the four-bar linkage mechanisms 344, and is paid out in a neatly stretched condition.

When the person gets into the vehicle, after the person moves from the wheelchair onto the seat main body 310 that has been moved to the exterior of the vehicle cabin and sits thereon, the driving motor 371 of the raising/lowering mechanism 340 is actuated in the reverse direction so that the four-bar linkage mechanisms 344, 344, are restored to the interior of the vehicle chamber together with the seat main body 310. After the movement base 341 is moved to the retreated position and the four-bar linkage mechanisms 344, 344 are restored to the interior of the vehicle cabin, the driving motor 352*a* of the second slide mechanism 350 is actuated to restore the seat main body 310 to the interior of the vehicle cabin. In the stage where the seat main body 310 is restored to the interior of the vehicle cabin from a getting on/out position outside the vehicle cabin, the cover member 360 is automatically taken up by the take-up device 365.

Thereafter, the rotation motor 332 of the rotation mechanism 330, and the driving motor 324*a* of the first slide mechanism 320, are actuated so that the seat main body 310 is slid backwards while rotating by approximately 90 degrees toward the front side of the vehicle. As a result, the seated person can move into a predetermined seating position (the passenger seat position). During this time, the seated person may remain seated on the seat main body 310. This may remarkably reduce the labor of the seated person and any helpers for the seated person.

According to the vehicle seat moving apparatus 301 of this embodiment constructed as described above, when the seat main body 310 is positioned so as to face the door opening K and is moved to the exterior of the vehicle cabin, the cover member 360 is paid out from the take-up device 365 so that the movement route for the seat main body 310 is covered with the cover member 360. Thus, the components such as the raising/lowering mechanism, which would be exposed in the prior art when the seat main body is moved to the exterior of the vehicle cabin, are concealed because they are covered with the cover member 360. As a result, the vehicle seat moving apparatus 301 may have an increased appearance. This may provide improved commercial value to the seat apparatus 1.

Further, because the entire raising/lowering mechanism 340 is covered with the cover member 360, the occupants, their clothes, or other such parts of the occupants do not contact the components of the raising/lowering mechanism 340. Therefore, the seat apparatus 301 may have increased operability.

Further, as shown in FIG. 34, in the condition in which the seat main body 310 is situated at a getting on/out position outside of the vehicle cabin, the reinforcing bar 361 of the cover member 360 is located on the upper surface of the movement base 341, so that the cover member 360 is bent in a substantially chevron-shape to be divided into a front range with respect to the reinforcing bar 361 (a range between the seat main body 310 and the reinforcing bar 361) and a rear range (a range between the reinforcing bar 361 and the take-up device 365). Therefore, the cover member 360 can effectively cover the range extending along the four-bar linkage mechanisms 344, 344 and the range extending along the rotation base 331 in a neatly stretched condition.

The sixth embodiment described above can be variously modified. For example, although in the above embodiment, a cover member 360 formed from synthetic leather is exemplified, it is also possible to use a cover member that is formed from a vinyl sheet, cloth or other such materials.

Further, although the cover member that is paid out and taken up as the seat main body moves is exemplified, an electric take-up device can be used so that the cover member can be taken up or paid out by actuating the take-up device in synchronism with the movement of the seat main body 310.

Further, although the single reinforcing bar 361 is disposed in only one position in the taking-up/paying-out direction, a plurality of reinforcing bars can be disposed, if necessary.

Further, although the reinforcing bar 361 is used as a stretching means, it is instead possible for example to weave reinforcing wires into the cover member 360 in order to maintain the cover member 360's stretched condition. Further, it is also possible to use a large number of plate materials having a small width as the stretching means. In this case, the plates would be rotatably connected, thereby forming the cover member.

Further, although the vehicle seat moving apparatus 1, 201, and 301, are exemplified as applied to the left-hand side in the second seat row of the vehicle M, the apparatus can be applied to the passenger seat, the driver's seat, or seats that are used in other positions.

The invention claimed is:

1. A vehicle seat moving apparatus for moving a seat main body between an interior position of a vehicle cabin and an exterior position of the vehicle cabin that is positioned below the interior position, comprising:
a slide base provided to a vehicle floor side so as to be horizontally movable between a retreated position and an advanced position;
a driving device for moving the slide base;
a pair of seat raising/lowering arms, each of which supports the seat main body at one end and is vertically rotatably attached to the slide base via a rotation fulcrum at the other end; and
a pair of ascent/descent guide members, each of which is provided to the vehicle floor side and is adapted to guide one of said seat raising/lowering arms such that the seat raising/lowering arm is vertically rotated as the slide base moves, each ascent/descent guide member comprising a cam plate,
wherein each seat raising/lowering arm is provided with a supported portion that comprises a roller that rolls on the cam plate and each ascent/descent guide member is provided with an inclined guide surface that is gradually lowered toward an exterior of the vehicle cabin, wherein as the slide base moves, the supported portion is moved along the inclined guide surface so that the seat raising/lowering arm is vertically tilted while a distance between the rotation fulcrum and the supported portion is maintained at a fixed interval, wherein each seat raising/lowering arm comprises two plates that are arranged at a predetermined interval and a connecting member that interconnects opposing end portions of the two plates, wherein the roller is disposed between the two plates, and wherein the seat raising/lowering arms and the ascent/descent guide members are respectively positioned on both sides of the slide base.

2. The vehicle seat moving apparatus according to claim 1, wherein the supported portion is disposed in the vicinity of the rotation fulcrum at the other end with respect to the slide base.

3. The vehicle seat moving apparatus according to claim 1, wherein the ascent/descent guide member has a horizontal guide surface on which the supported portion horizontally moves when the slide base is moved from the advanced position to the retreated position.

4. The vehicle seat moving apparatus according to claim 1, wherein when the slide base moves between the retreated position and the advanced position, the seat raising/lowering arm moves in an ascent/descent movement region in which it is vertically rotated while it is guided by the ascent/descent guide member and a horizontal movement region which does not involve vertical rotation, wherein the horizontal movement of the seat raising/lowering arm in the horizontal movement region is performed by supporting a lower surface of the seat raising/lowering arm by means of a horizontal retaining member that can slidably contact the lower surface, and wherein while the seat raising/lowering arm is moving in the horizontal movement region, the horizontal retaining member is in an advanced side than relative to the supported portion.

5. The vehicle seat moving apparatus according to claim 1, wherein the ascent/descent guide member has a stopper portion which is positioned at an end of the inclined guide surface, so that the stopper portion contacts the supported portion that moves obliquely downwards on the guide surface, thereby restraining further movement of the supported portion.

6. The vehicle seat moving apparatus according to claim 1,
wherein the driving device for the slide base comprises an electric motor, a screw shaft rotated by the electric motor, and a nut meshing with the screw shaft, and
wherein the screw shaft is provided with a stopper member, so that when a relative moving amount of the screw shaft and the nut in an axial direction exceeds a predetermined value, the stopper member contacts the nut, thereby restraining further relative movement.

7. A vehicle seat moving apparatus according to claim 1, wherein a forward end side of a cover member that can be taken up by a take-up device is fixed to a rear portion of the seat main body, wherein the take-up device is attached to the vehicle floor side at a rear side of the seat main body, and wherein the cover member is paid out from the take-up device as the seat main body moves toward the exterior of the vehicle cabin due to the movement of the slide base, so as to cover a range extending along the seat raising/lowering arm and a range extending along the vehicle floor side which ranges are positioned between the seat main body and the take-up device, and to maintain a stretched condition of the cover member in the width direction thereof at a boundary position between both ranges by a stretching means attached to the cover member.

8. A vehicle seat moving apparatus according to claim 7, wherein the stretching means is a reinforcing bar that is attached to the cover member along the width direction thereof at the boundary position between the both ranges.

* * * * *